US012593181B2

(12) United States Patent
Hofbauer et al.

(10) Patent No.: US 12,593,181 B2
(45) Date of Patent: Mar. 31, 2026

(54) HEARING DEVICE ARRANGEMENT AND METHOD FOR AUDIO SIGNAL PROCESSING

(71) Applicant: Sonova AG, Stäfa (CH)

(72) Inventors: Markus Hofbauer, Hombrechtikon (CH); Andreas Breitenmoser, Wetzikon (CH); Claudio Santelli, Stäfa (CH); Paul Wagner, Portland, OR (US); Sebastian Kroedel, Erlenbach (CH); Manon Barbier, Soultzmatt (FR); Manuela Feilner, Egg (CH)

(73) Assignee: Sonova AG, Stäfa (CH)

( * ) Notice: Subject to any disclaimer, the term of this patent is extended or adjusted under 35 U.S.C. 154(b) by 533 days.

(21) Appl. No.: 18/168,073

(22) Filed: Feb. 13, 2023

(65) Prior Publication Data

US 2023/0262400 A1 Aug. 17, 2023

(30) Foreign Application Priority Data

Feb. 14, 2022 (EP) .................................... 22156577

(51) Int. Cl.
*H04R 25/00* (2006.01)

(52) U.S. Cl.
CPC ......... *H04R 25/507* (2013.01); *H04R 25/552* (2013.01); *H04R 25/554* (2013.01); *H04R 2225/55* (2013.01)

(58) Field of Classification Search
CPC .............. H04R 25/552; H04R 2225/43; H04R 2225/41; H04R 25/507
See application file for complete search history.

(56) References Cited

U.S. PATENT DOCUMENTS

2015/0189449 A1* 7/2015 Udesen .................. H04R 25/43 381/315
2017/0295439 A1 10/2017 Xu et al.
2018/0206046 A1 7/2018 Rosenkranz et al.
2019/0394586 A1 12/2019 Pederson et al.
(Continued)

FOREIGN PATENT DOCUMENTS

DE 102019200954 A1 7/2020
WO 2020224914 A1 11/2020

OTHER PUBLICATIONS

Search Report issued in European Patent Application No. 22156577 dated Jul. 24, 2022.

(Continued)

*Primary Examiner* — Kile O Blair
(74) *Attorney, Agent, or Firm* — McDonald Hopkins LLC

(57) ABSTRACT

A hearing device arrangement includes two hearing devices which are connected to each other in a data transmitting manner. Each hearing device includes an audio input unit for obtaining an input audio signal, a processing unit for audio signal processing of the input audio signal to obtain an output audio signal, a neural network which, when executed by the processing unit performs a processing step of the audio signal processing, and an audio output unit for outputting the output audio signal. The hearing device arrangement is configured to transmit neural network data of the neural network of at least one of the hearing devices to the respective other hearing device to be used in the audio signal processing by the processing unit of the respective other hearing device.

21 Claims, 16 Drawing Sheets

(56) References Cited

U.S. PATENT DOCUMENTS

| | | | |
|---|---|---|---|
| 2021/0105565 | A1 | 4/2021 | Pederson et al. |
| 2022/0095061 | A1 | 3/2022 | Diehl et al. |

OTHER PUBLICATIONS

Gamper, Hannes, et al.: “Blind Reverberation Time Estimation Using a Convolutional Neural Network”, 2018 16th International Workshop on Acoustic Signal Enhancement (IWAENC), IEEE, Sep. 17, 2018, pp. 136-140, XP033439009.

* cited by examiner

HEARING DEVICE ARRANGEMENT AND METHOD FOR AUDIO SIGNAL PROCESSING

The present inventive technology concerns a hearing device arrangement, for example a hearing device arrangement in form of a hearing device system. The present inventive technology further relates to a method for audio signal processing, in particular a method for audio signal processing on a hearing device system.

BACKGROUND

Hearing devices and audio signal processing on hearing devices are known from the prior art. Neural network processing can be used for an improved audio signal processing, e.g. for a noise cancellation, speech enhancement and/or feedback cancellation.

BRIEF SUMMARY

It is an object of the present inventive technology to improve audio signal processing on hearing devices, in particular to render audio signal processing flexible and efficient.

This object is achieved by a hearing device arrangement as claimed in independent claim 1. The hearing device arrangement comprises two hearing devices which are connected to each other in a data transmitting manner. Each hearing device comprises an audio input unit for obtaining an input audio signal, a processing unit for audio signal processing of the input audio signal to obtain an output audio signal, a neural network which, when executed by the processing unit, performs a processing step of the audio signal processing, and an audio output unit for outputting the output audio signal. The hearing device arrangement is configured to transmit neural network data of the neural network of at least one of the hearing devices to the respective other hearing device to be used in the audio signal processing by the processing unit of the respective other hearing device. Transmitting neural network data has the advantage that the audio signal processing on the hearing device, which receives the neural network data, can profit from the execution of the neural network on the at least one other hearing device. The overall quality of the audio signal processing on the hearing device arrangement is improved.

A particular advantage of the hearing device arrangement is that different calculation steps can be distributed among different hearing devices. Transmitting neural network data from one hearing device to the respective other hearing device allows to enhance the audio signal processing on that respective other hearing device without needing to execute the same neural network processing on that hearing device. Computational power of the hearing device receiving the neural network data can be saved and/or used for other processing steps. The hearing devices can share their computational power. The battery consumption on each of the hearing devices may advantageously be reduced or more evenly distributed. This is particularly advantageous for neural network processing on hearing devices, in particular hearing aids, because hearing devices have limited computational resources and battery capacity due to their small size.

Another advantage of the transmittal of the neural network data to the respective other hearing device is that spatial information contained in the neural network data may be taken into account in the audio signal processing on the respective other hearing device. This improves binaural processing, in particular binaural cues preservation. The spatial image is preserved. Binaural distortion may be reduced. Preferably, the neural network data, which is transmitted, is used in the audio signal processing by the processing unit of each hearing device.

Preferably, the hearing device arrangement is configured to provide neural network data of the neural networks of each hearing device to the respective other hearing device to be used in the audio signal processing by the processing unit of the respective other hearing device. This further increases the flexibility in distributing processing steps. Moreover, the quality of audio signal processing can be further improved by using neural network data produced by the neural networks on the respective other device. This is particularly advantageous for binaural processing, in particular binaural cues preservation.

A hearing device as in the context of the present inventive technology may be a wearable hearing device, in particular a wearable hearing aid, or an implantable hearing device, in particular an implantable hearing aid, or a hearing device with implants, in particular a hearing aid with implants. An implantable hearing aid is, for example, a middle-ear implant, a cochlear implant or brainstem implant. A wearable hearing device is, for example, a behind-the-ear device, an in-the-ear device, a spectacle hearing device or a bone conduction hearing device. In particular, the wearable hearing device can be a behind-the-ear hearing aid, an in-the-ear hearing aid, a spectacle hearing aid or a bone conduction hearing aid. A wearable hearing device may also be suitable headphones, for example what is known as a hearable or smart headphone.

The hearing device arrangement may comprise one or more hearing device systems. In particular, the hearing device arrangement may be comprised by a hearing device system. For example, the two hearing devices of the hearing device arrangement may be part of a hearing device system. A hearing device system in the sense of the present inventive technology is a system of one or more devices being used by a user, in particular by a hearing impaired user, for enhancing his or her hearing experience. For example, the hearing devices of the hearing device arrangement may be wearable or implantable hearing devices associated with the left and right ear of a user, respectively. It is also possible that the hearing device arrangement comprises devices of different hearing device systems. For example, the hearing devices of the hearing device arrangement may be part of different hearing device systems of different users.

Particularly suitable hearing device arrangements, in particular hearing device systems, can further comprise one or more peripheral devices. A peripheral device in the sense of the inventive technology is a device of a hearing device arrangement, in particular a hearing device system, which is not a hearing device, in particular not a hearing aid. In particular, the one or more peripheral devices may comprise a mobile device, in particular a smartwatch, a tablet and/or a smartphone. The peripheral device may be realized by components of the respective mobile device, in particular the respective smartwatch, tablet and/or smartphone. Particularly preferably, the standard hardware components of a mobile device are used for this purpose by virtue of an applicable piece of hearing device system software, for example in the form of an app being installed and executable on the mobile device. Additionally or alternatively, the one or more peripheral devices may comprise a wireless microphone. Wireless microphones are assistive listening devices used by hearing impaired persons to improve understanding of speech in noisy surroundings and over distance. Such wireless microphones include, for example, body-worn microphones or table microphones.

Preferably, a peripheral device may comprise peripheral sensors whose sensor data may be used in the audio signal processing. Suitable sensor data is, for example, position data, e.g. GPS data, vital signs and/or user health data. Further, peripheral information may be available on or through a peripheral device. Exemplary peripheral information may comprise meta data on the position of a user, such as information about surroundings and places a user is in. Additionally or alternatively, peripheral information being available via the peripheral device, in particular via a smartphone, may include user profile data, user preferences, weather data and/or information about other people interacting with the user. Such information may for example be provided via a network, in particular via the internet and/or the internet of things, to which the peripheral device may connect.

The hearing devices of the hearing device arrangement may further be connectable to one or more remote devices, in particular to one or more remote servers. The term "remote device" is to be understood as any device which is not part of a hearing device system. In particular, the remote device is positioned at a different location than the hearing device system. A connection to a remote device, in particular to a remote server, allows to include remote devices in the audio signal processing. For example, parts of the audio signal processing may be executed on a remote device, in particular on a remote server. A remote device may in particular be used to train and update neural networks used on the hearing devices and/or a peripheral device of the hearing device arrangement. Additionally or alternatively, a remote device may be used to provide information to the hearing device arrangement, which may be used in the audio signal processing. For example, the remote server may provide information about a location in which a user of the hearing devices, in particular of a hearing device system, is in. Based on this information, the audio signal processing on the hearing devices may be correspondingly modified.

In the present context, an audio signal, in particular an audio signal in form of the input audio signal and/or the output audio signal, may be any electrical signal, which carries acoustic information. In particular, an audio signal may comprise unprocessed or raw audio data, for example raw audio recordings or raw audio wave forms, and/or processed audio data, for example extracted audio features, compressed audio data, a spectrum, in particular a frequency spectrum, a cepstrum and/or cepstral coefficients and/or otherwise modified audio data. The audio signal can particularly be a signal representative of a sound detected locally at the user's position, e.g. generated by one or more electroacoustic transducers in the form of one or more microphones, in particular one or more electroacoustic transducers of an audio input unit of the hearing device. An audio signal may be in the form of an audio stream, in particular a continuous audio stream. For example, the audio input unit may obtain the input audio signal by receiving an audio stream provided to the audio input unit. For example, an input signal received by the audio input unit may be an unprocessed recording of ambient sound, e.g. in the form of an audio stream received wirelessly from a peripheral device and/or a remote device which may detect the sound at a remote position distant from the user. The audio signals in the context of the inventive technology can also have different characteristics, format and purposes. In particular, different kinds of audio signals, e.g. the input audio signal and/or the output audio signal, may differ in characteristics and/or format.

The neural network of the hearing devices may be configured to receive audio signals and/or features derived from audio signals as a neural network input. The audio signal to be processed by the neural network, e.g. an audio signal input which is provided to the neural network's input, may be the input audio signal obtained by the audio input unit. The audio signal to be processed by the neural network may be processed audio data. For example, the audio signal to be processed by the neural network may be based on a spectrum, in particular a frequency spectrum, of the audio signal. For example, the input audio signal may be obtained by transforming an input signal received by the audio input unit by a Fast Fourier Transformation (FFT) or short-time Fourier transform (STFT). The audio signal inputted to the neural network may comprise a cepstrum. For example, the audio signal inputted to the neural network may comprise Mel-Frequency Cepstral Coefficients (MFCC) and/or other cepstral coefficients.

An audio input unit in the present context is configured to obtain the input audio signal. Obtaining the input audio signal may comprise receiving an input signal by the audio input unit. For example, the input audio signal may correspond to an input signal received by the audio input unit. The audio input unit may for example be an interface for the incoming input signal, in particular for an incoming audio stream. In incoming audio stream may already have the correct format. The audio input unit may also be configured to convert an incoming audio stream into the input audio signal, e.g. by changing its format and/or by transformation, in particular by a suitable Fourier transformation. Obtaining the input audio signal may further comprise to provide, in particular to generate, the input audio signal based on the received input signal. For example, the received input signal can be an acoustic signal, i.e. a sound, which is converted into the input audio signal. For this purpose, the audio input unit may be formed by or comprise one or more electroacoustic transducers, e.g. one or more microphones. The received input signal can also be an audio signal, e.g. in the form of an audio stream, in which case the audio input unit is configured to provide the input audio signal based on the received audio stream. The received audio stream may be provided from another hearing device, a peripheral device and/or a remote device, e.g., a table microphone device, or any other remote device constituting a streaming source or a device connected to a streaming source, including but not limited to a mobile phone, laptop, or television.

An audio output unit in the present context is configured to output the output audio signal. For example, the audio output unit may transfer or stream the output audio signal to another device, e.g. a peripheral device and/or a remote device. Outputting the output audio signal may comprise providing, in particular generating, an output signal based on an output audio signal. The output signal can be an output sound based on the output audio signal. In this case, the audio output unit may be formed by or comprise one or more electroacoustic transducers, in particular one or more speakers and/or so-called receivers. The output signal may also be an audio signal, e.g. in the form of an output audio stream and/or in the form of an electric output signal. An electric output signal may for example be used to drive an electrode of an implant for, e.g. directly stimulating neural pathways or nerves related to the hearing of a user.

Here and in the following, the term "audio signal processing" generally refers to modifying and/or synthesizing audio signals. A subset of audio signal processing is sound enhancement, which can comprise speech enhancement and/or noise cancellation. Sound enhancement may in particular improve intelligibility or ability of a listener to hear a particular sound. For example, speech enhancement refers to improving the quality of speech in an audio signal so that a listener can better understand speech.

A processing unit of the hearing device may comprise a data storage and a computing device. A data storage in the sense of the inventive technology is a computer-readable medium. The computer-readable medium may be a non-transitory computer-readable medium, in particular a data memory. Exemplary data memories include, but are not limited to, dynamic random access memories (DRAM), static random access memories (SRAM), random access memories (RAM), solid state drives (SSD), hard drives and/or flash drives.

Computing routines, in particular audio signal processing routines, which can be executed by the processing unit, may be stored on the data storage. The audio processing routines may comprise traditional audio processing routines and/or neural networks for audio signal processing. In the context of the present inventive technology, traditional audio signal processing and traditional audio signal processing routines are to be understood as an audio signal processing and audio signal processing routines which do not comprise methods of machine learning, in particular which do not comprise neural networks, but can, e.g., include digital audio processing. Traditional audio signal processing routines include, but are not limited to linear signal processing, such as, for example, Wiener filters and/or beamforming.

A computing device of the processing unit may comprise a general processor adapted for performing arbitrary operations, e.g. a central processing unit (CPU). The computing device may alternatively or additionally comprise a processor specialized on the execution of a neural network. Preferably, a computing device may comprise an AI chip for executing a neural network. AI chips can execute neural networks efficiently. However, a dedicated AI chip is not necessary for the execution of a neural network. The computing device may execute one or more audio signal processing routines stored on the data storage of the hearing device.

In the context of the present inventive technology, the term “neural network” is to be understood as an artificial neural network, in particular a deep neural network (DNN). When executed, the neural network performs a step of the audio signal processing. The neural network can be configured to perform any suitable step of the audio signal processing. The neural network may preferably be configured for audio signal processing. For example, the neural network may be used for noise attenuation, in particular noise cancellation, speech enhancement, classification, in particular audio scene classification, source location, voice detection, in particular voice detection for detecting a user voice (also referred to as own voice detection or OV Detection), speaker extraction, speaker separation, dereverberation, key word recognition, feedback cancellation and/or feature extraction. The neural network may receive audio signals and/or other sensor data as an input.

The neural network may directly process audio signals and result in a neural network output which may be used in the further processing steps in the audio signal processing on the processing unit of the hearing device. For example, a neural network for audio scene classification may return a classification parameter which resembles the predicted audio scene in which the user is in. Based on the classification parameter, the further audio signal processing on the hearing device arrangement may be steered, in particular suitable audio processing routines may be chosen based on the classification parameter.

The neural network may also be configured to solve audio-related regression problems, such as noise cancellation, speech enhancement, dereverberation and/or feedback cancellation. The regression-based acoustic processing may result a neural network output audio data which may be outputted by the neural network. Such neural network output audio data may comprise audio signals and/or other audio data which can be used to transform audio signals. For example, the neural network output audio data may comprise a filter mask and/or gain models. The filter mask may be used to filter the input audio signal. Gain models may be applied to audio signals, in particular to frequency bands of a frequency spectrum. For example, a neural network adapted for regression-based noise cancellation may directly output denoised audio signals. Additionally or alternatively, a network adapted for regression-based noise cancellation may output a filter mask with which the input audio signal and/or features extracted from the input audio signal may be filtered to attenuate noise, in particular to remove noise.

Feature extraction by use of the neural network of at least one of the hearing devices may comprise calculation of local features based on input audio signals and/or sensor data. Local features may comprise correlations, coherence, spectra, focus and/or differences in sensor data of different hearing devices, in particular differences between hearing devices which are worn at the left and right ear of a user, respectively. Correlations may in particular comprise cross-correlations, such as, for example, microphone cross-correlations. For example, features extraction may comprise calculating microphone cross-correlation features from input audio signals obtained from different microphones. Input audio signals may be obtained from different microphones for example by providing input signals from different microphones to the audio input unit, e.g. in form of an audio stream. Focus is to be understood as a measure of the focus of a user of the hearing device, in particular where a user of the hearing device is looking at. Feature calculation may additionally or alternatively be based on head acoustics, head movements, user activity and/or vital signs. Head movements may, for example, be measured by an accelerometer. Vital signs may, for example, be obtained by health sensors.

Extracted features may be transferred to the respective other hearing device for further processing, in particular for further processing by the neural network of the respective other hearing device. It is also possible to transmit features, in particular microphone cross-correlations, to a peripheral device for further processing, for example for sound source location based on the local features, which have been extracted on one or more hearing devices. Features may be (pre-)calculated on one of the hearing devices and then be transferred to the other hearing device and/or other devices of the hearing device arrangement for further processing. Processing power can be efficiently and flexibly distributed over several devices. A further advantage of transmitting locally extracted features is that the transmission of features requires less data volume, in particular features can be transmitted as compressed data.

Configuration of a neural network may comprise providing a suitable network architecture and/or training the neural network. Suitable network architectures and training routines, in particular suitable training data sets, neural networks performing a step of audio signal processing are known from the prior art.

Suitable network architectures, in particular for regression-based acoustic processing, may be recurrent neural networks, convolutional neural networks and/or convolutional recurrent neural networks. Particularly suitable neural network architectures may be convolutional recurrent neural networks having a U-net structure. Such neural networks may comprise an encoder module, a bottleneck module and a decoder module. It is also possible to realize different modules, in particular an encoder module, a bottleneck module and/or a decoder module in different neural networks, in particular in different neural networks which are executed sequentially.

The neural network may comprise one or more layers of neurons. For example, the neural network may comprise an input layer for receiving neural network inputs. The neural network may further comprise an output layer for outputting neural network outputs. The neural network may comprise one or more hidden layers being arranged in between the input layer and the output layer. For example, the network may comprise fully connected layers and/or gated recurrent unit layers.

The neural network may be executed on the respective hearing device, in particular by the processing unit of the respective hearing device. For example, the neural network may be stored in a data storage of the respective computing unit of the hearing device and may be executed by the respective computing device of the hearing device.

In case that the hearing device arrangement, in particular the hearing device system, comprises an additional device, in particular a peripheral device, a peripheral neural network may be stored and executed on the peripheral device. Running a neural network on a peripheral device has the advantage that the peripheral device is less restricted with regard to computational power and/or battery capacity than a hearing device, in particular a hearing aid. A peripheral neural network may, for example, be configured to solve more complex tasks. For example, a peripheral neural network may be configured for executing general audio scene classification. The neural networks of the hearing devices may be configured to perform a more specialized task. Specialized neural networks may require less computational resources.

Different devices of the hearing device arrangement, in particular of the hearing device system, may comprise and execute different audio processing routines, in particular different neural networks for audio signal processing. It is also possible that a neural network for audio signal processing may be spread over several devices of the hearing device arrangement, in particular different neural network modules may be realized by different neural networks being stored and executable on different devices, in particular on different hearing devices, of the hearing device arrangement.

The neural networks of the hearing devices of the hearing device arrangement may be configured to solve equivalent steps of the audio signal processing. Alternatively, the neural networks of the hearing devices may be configured to perform different processing steps of the audio signal processing.

In the sense of the present inventive technology, the term "neural network data" is to be understood as data comprising a neural network output, an intermediate neural network output and/or neural network parameters, in particular neural network states.

A neural network output is the result of the network processing. For example, a neural network output of a neural network being configured for calculating a filter mask for noise cancellation is the calculated filter mask.

An intermediate neural network output is an intermediate result of the neural network processing. For example, the neural network may comprise one or more layers hidden layers. An intermediate neural network output may be a network result on the level of one or more of the hidden layers. In particular, a neural network may comprise different functional modules. For example, a neural network may be configured to extract features from an audio signal and to further process the audio signal based on the extracted features. Such a neural network may comprise a feature extraction module and an audio signal processing module which are arranged sequentially. The neural network output of such a neural network may resemble the result of the audio signal processing. The neural network data may additionally or alternatively comprise an intermediate neural network output in form of the extracted features. The intermediate neural network output may be the output of the feature extraction module.

Neural network parameters refer to any information which characterizes the state of the neural network, in particular the internal state of the neural network. Neural network parameters may in particular comprise neural network states, network weights, neural network features and/or activation functions.

Different devices of the hearing device arrangement, in particular the hearing devices and/or peripheral devices, may be connectable in a data transmitting manner, in particular by a wireless data connection. A wireless data connection may also be referred to as wireless link or WL link. The wireless data connection can be provided by a global wireless data connection network to which the components of the hearing device arrangement can connect or can be provided by a local wireless data connection network which is established within the scope of the hearing device arrangement, in particular within the scope of the hearing device system. The local wireless data connection network can be connected to a global data connection network as the Internet e.g. via a landline or it can be entirely independent. A suitable wireless data connection may be by Bluetooth or similar protocols, such as, for example, Asha Bluetooth. Further exemplary wireless data connections are DM (digital modulation) transmitters, aptX LL and/or induction transmitters (NFMI). Also other wireless data connection technologies, e.g. Broadband Cellular Networks, in particular 5G Broadband Cellular Networks, and/or WiFi wireless network protocols, can be used.

Neural network data can be transmitted between devices of the hearing device arrangement, in particular the hearing devices, using the data connection, in particular a WL link. Additionally, other kind of data may be transmitted between the devices of the hearing device arrangement, in particular the hearing devices. For example, the input audio signal and/or features derived from the input audio signal may be transmitted from one hearing device to the other. Preferably, input audio signal and/or features derived therefrom may be exchanged between the two hearing devices. This allows to include audio signals and/or features derived therefrom in the audio signal processing, in particular in the neural network processing, on the respective other hearing device.

According to a preferred aspect of the inventive technology, the neural network of the respective hearing devices are configured to perform different processing steps of the audio signal processing. This advantageously allows to distribute different processing tasks on the different hearing devices of the hearing device arrangement. This is particularly advantageous if the hearing device arrangement is configured to transmit the respective neural network data of the neural networks of each hearing device to the respective other hearing device. Different processing steps can be performed on different devices, in particular can be performed in parallel on different devices. The respective neural network data advantageously may improve the further audio signal processing on the respective other hearing device.

For example, the neural network of one hearing device may be configured for OV detection and/or key word recognition. The neural network of the respective other hearing device may be configured for scene classification. This allows a particular advantageous steering of the further audio signal processing on the hearing devices based on OV detection, key word recognition and/or scene classification. The further audio signal processing can be precisely adapted to the hearing situation in which one or more users of the hearing devices of the hearing device arrangement, in particular in which the user of a hearing device system, is in. Particularly preferable, a peripheral neural network may additionally be executed on the peripheral device. The peripheral neural network may be configured for performing another step of the audio signal processing. For example, the peripheral neural network may be configured for extracting additional feature and/or audio scene classification. In particular, the peripheral neural network may comprise a more general classifier.

Distributing different computational tasks on different devices preferably is based on their computational complexity and/or their criticality in respect to latency. For example, computationally more demanding processing steps may be executed on a peripheral device, such as a general audio scene classification and/or feature extraction and/or feature analysis. Computational less demanding tasks, such as OV detection, mask calculation, local feature extraction and/or key word recognition, may preferably be executed on the hearing devices. The distribution of computational tasks may in particular be based on latency considerations. For example, a general audio scene classification is less critical with respect to latency, in particular because the audio scene does in general not change that fast. Processing steps being more critical with respect to latency, in particular filter mask calculation, are preferably performed on the hearing devices. For example, if update rates of processing steps are larger than 100 ms, execution of the respective processing step on a peripheral device does not impair the latency of the overall audio signal processing. For update rates below 100 ms, it may be advantageous to execute the processing step directly on the hearing device. The distribution of different processing steps, in particular the distribution of different neural networks, among different devices of the hearing device arrangement in accordance with computational costs, in particular computational load and/or battery consumption, and/or latency is an independent aspect of the inventive technology, in particular independent of the transmittal of a neural network data of one hearing device to the respective other hearing device.

According to a preferred aspect of the hearing device arrangement, the hearing device arrangement is further configured to use the neural network data of the neural network of at least one of the hearing devices as a neural network input for the neural network of the respective other hearing device. This allows to further process the neural network data on the other device using a neural network. For example, features extracted by the neural network on one of the hearing devices may be inputted to the neural network on the other hearing device. Information obtained by neural network processing on one hearing device may be used in neural network processing on the other hearing device. This is particularly advantageous for binaural processing.

Preferably, the hearing device arrangement is configured to use the neural network output of the neural network of one of the hearing devices as a neural network input for the neural network of the other hearing device. The networks on the respective hearing devices can be arranged sequentially. This allows for a more complex neural network processing. For example, the neural networks of the respective hearing devices may realize network modules of a more complex neural network. For example, the neural network of one hearing device may comprise an encoder module and a bottleneck module of a U-shaped network structure. The output of this neural network may be transmitted to the respective other hearing device. The neural network on the other hearing device may realize a decoder module of the U-shaped network structure. The transmitted neural network output can be used as an input to the decoder module. The neural network output of the decoder module resembles the output of a U-shaped network structure. Doing so, a complex network structure, in particular a U-shaped network structure, can be implemented on the hearing devices despite their computational restrictions. The transmitted neural network data may additionally or alternatively comprise intermediate neural network outputs and/or neural network parameter. The transmission of intermediate neural network outputs and/or neural network parameters may advantageously be used to realize skip connections in a U-shaped network structure. Particularly preferable, the transmitted neural network data comprises a neural network output and intermediate neural network outputs. This allows to realize a U-shaped network structure comprising skip connections being distributed among the hearing devices.

According to a preferred aspect of the inventive technology, the hearing device arrangement is further configured to assign a work cycle to each of the neural networks, wherein the work cycles govern the execution of the neural network by the respective processing units. Assigning a work cycle to each of the neural networks allows to precisely determine how and when the neural networks are executed. For example, the work cycles may be determined based on a time schedule, processing requirements and/or sensor data. The work cycles of different neural networks may coincide or differ.

According to a preferred aspect of the inventive technology, work cycles of the neural networks of different of the two hearing devices differ, in particular alternate. The work cycles of the respective neural networks can be adapted to the respective needs. For example, if the respective neural networks are configured to solve different steps of the audio signal processing, the respective work cycles may resemble the necessity of the respective audio signal processing step. For example, the respective neural networks can be specialized on processing specific types of sounds. For example, one neural network may be specialized on enhancing speech while the other neural network is specialized on attenuation of background noise, such as for example traffic noise and/or monotonous background noise. Depending on the kind of sounds contained in the input audio signal, the respective work cycle of the neural networks can be chosen.

Differing, in particular alternating, work cycles are particularly advantageous in that the execution of the neural network on one hearing device may replace the execution of the neural network of the respective other hearing device.

For example, the neural networks on the different hearing devices are configured to perform equivalent processing steps of the audio signal processing. The hearing device arrangement may be configured to only execute one of the neural networks and to transmit the neural network output to the respective other neural network. Doing so, the computational load and/or battery consumption of neural network processing can be distributed on to the two hearing devices. Particularly preferable, the neural networks on the hearing devices may be alternately executed by the respective processing units.

Differing, in particular alternating, work cycles may be determined based on a time schedule and/or sensor data. For example, different, in particular alternating, work cycles of the neural networks may result in a time multiplexing of the neural network execution. For example, the neural networks may be alternately executed based on fixed time intervals. For example, the work cycle of each neural network may be fixed at 50% with regard to total processing time. Thus, the computational load and battery consumption may be equally distributed among the hearing devices. The respective work cycles, in particular the respective multiplexing scheme, may also reflect the remaining state of charge of the respective batteries of the hearing device. If one of the hearing devices runs low on battery, the workload for the respective hearing device, in particular the work cycle of the neural network processing on that hearing device, may be reduced in favor of the work cycle of the neural network on the respective other hearing device.

According to a preferred aspect of the inventive technology, the hearing device arrangement is further configured to determine the work cycles based on internal states and/or external states of the hearing device arrangement. Internal states and/or external states of the hearing device arrangement may be obtained by monitoring respective sensor data. The execution of the neural networks on the hearing device arrangement can be flexibly steered. This allow a particularly efficient distribution of neural network processing based on internal states and/or external states of the hearing device arrangement. For example, selection criteria may be defined based on internal states and/or external states. The selection criteria may comprise thresholds for internal states and/or external states, which, once reached, trigger the selection of a respective neural network.

Internal states of the hearing device arrangement are based on data obtained through system monitoring of the hearing device arrangement, in particular of the hearing devices. Exemplary internal states comprise memory capacity, processor load, working temperature, battery level, sensor health and/or radio strength. Particularly relevant internal states may be memory capacity, processor load and/or battery level. Work cycles of the neural networks and with that the execution of the neural networks, may be distributed based on one or more internal states. For example, depending on the battery level of the hearing devices, the workload of a hearing device with a higher state of charge may be increased. Sensor health reflects in how far the data obtained by a sensor is reliable. A damaged sensor may result in unreliable and/or unusable sensor data. For example, if the audio input unit, in particular a microphone thereof, of one of the hearing devices is damaged, the obtained input audio signal may comprise high levels of noise. In this case, it may be advantageous to use the input audio signal obtained with the audio input unit of the respective other hearing device. In this regard, the work cycle of the neural network on the hearing device, which has better sensor health, may be increased.

External states of the hearing device arrangement may be obtained through sensing the environment outside the hearing device arrangement, in particular outside the hearing devices. Respective sensor data may include audio, motion, location, temperature, pressure, light and/or health data. Particularly relevant sensor data may comprise audio, motion and/or location data. Based on the sensor data for external states, suitable selection criteria may be chosen to select the work cycles of the neural networks. Suitable selection criteria are signal quality, in particular signal-to-noise-ratio, signal strength, signal reliability, in particular dropouts, signal completeness, signal spectra, signal latency, data availability and/or spatial information about the environment, for example spatial information in form of coherence. Particularly relevant selection criteria may be signal quality, in particular signal-to-noise-ratios, latency and/or spatial information about the environment. For example, the signal-to-noise-ratio of the input audio signal may determine the work cycles of the neural networks. For example, the execution of the neural network may be a triggered for that hearing device, which obtains the input audio signal with the best signal quality, in particular the best signal-to-noise-ratio.

Preferably, the determined work cycles may be different, in particular alternate, based on sensor data multiplexing. The work cycles of the neural networks may be determined based on an evaluation of the respective sensor data.

Sensor data for sensor data multiplexing can be read out at regular intervals. For example, a typical period for sensor data read-out to obtain internal states and/or external states may be on the order of 0.1 seconds or slower depending on the sensor type. Independent of the read out frequency the work cycle can be determined on different timescales. The timescales of the work cycles may depend on the kind of determination of the work cycles.

For example, time multiplexing, in particular time multiplexing with fixed work cycles, does not require a fast change in neural network processing. Time multiplexing may be executed on rather long time scales. This may in particular be advantageous because fast switching could be audible due to processing of different input audio signals by the hearing devices of different hearing devices. For example, input audio signals obtained by the audio input unit may differ due to different locations of the hearing devices. For example, if the hearing devices are part of a hearing device system and are worn on the left and right ear of a user, respectively, larger differences in the input audio signal of the respective hearing device may be caused by head shadow and/or fast head movements. To avoid audible changes upon the switching of the neural networks, time multiplexing timescales may be on the order of one or more minutes.

In case the work cycles are determined by external states, switching of the neural networks may occur on rather short timescales. For example, the acoustic scene can vary within seconds, based on moving subjects. Head movements may cause an even faster change, in particular in the quality of the input audio signal. For example, if the user of the hearing device system is approached by another person from one side, it may be necessary to switch the neural network processing to the respective hearing device on a short timescale in order to not miss relevant audio data, in particular speech onset.

Multiplexing based on internal states may be done on longer timescales. Internal states, such as battery capacity and/or sensor health, do not change on short timescales.

Thus, multiplexing may be executed on longer timescales, e.g. on the timescale of one or more minutes.

Independently of how the work cycles are determined, audible changes upon switching neural network processing may preferably be reduced, in particular avoided, by successively fading the processing from one neural network to the other. Particularly preferably, neural network states, in particular neural network features, may be exchanged in between the neural networks upon the switching of the neural networks. Transmitting neural network states, in particular neural network features, from one neural network to the other allows to hand over processing context from the one neural network to the other. This way, consistency in the neural network processing is improved upon the switching from one neural network to the other.

It is possible to multiplex neural network processing entirely. For example, the neural networks of the hearing devices may be alternately executed based on the respective work cycles. It is also possible to multiplex only parts of the neural network processing on the hearing devices. For example, the neural networks may comprise a feature extraction module for extracting features and a mask calculation module for calculating a filter mask based on the previously extracted features. In this case, multiplexing may occur only for one of the two modules. For example, feature extraction may be multiplexed, in particular time multiplexed or sensor data multiplexed. Particularly preferable, feature extraction may be alternately executed by the feature extraction module on the respective hearing devices based on sensor data multiplexing. For example, feature extraction may be executed on the hearing device whose audio input unit obtains the input audio signal with the best signal quality, in particular the best signal-to-noise-ratio.

According to a preferred aspect of the inventive technology, the hearing device arrangement is further configured to transmit features obtained, in particular extracted, from the input audio signal and/or sensor data of at least one of the hearing devices to the respective other hearing device and to use the transmitted features as part of a neural network input for the neural network of the respective other hearing device. This allows to exchange information obtained from the input audio signal and/or sensor data between the hearing devices. Binaural processing, in particular binaural cues preservation, is improved. This is particularly advantageous for executing the neural networks with different, in particular alternating, work cycles. The neural network processing on one hearing device may process information obtained from the input audio signal and/or other sensor data received by the respective other hearing device in the audio signal processing. The transmitted features may comprise the input audio signal and/or the sensor data itself and/or features extracted therefrom, e.g. spectra, correlations and/or coherence.

According to an advantageous aspect of the inventive technology, the hearing devices belong to different users. In particular, the hearing devices may be part of different hearing device systems of different users. The hearing device arrangement may comprise different hearing device systems. The hearing device arrangement may be a network of two or more hearing devices of different users. This allows for an even more flexible distribution of neural network processing on different devices. In particular, users which are in the same hearing situation can profit from such a hearing device arrangement. For example, in a situation where several people are engaged in a conversation, feature extraction may be executed on the hearing device of a user which is closest to the speaker and thus receives the cleanest signal. This is in particular advantageous for noisy situations like conversations in crowded places, e.g. a restaurant.

It is a further object of the inventive technology to improve a method for audio signal processing, in particular to provide a method which is flexible and efficient.

This object is achieved by the method with the steps comprised in claim 9. Two hearing devices which are connected to each other in data transmitting manner are provided. Each of the provided hearing device comprises an audio input unit for obtaining an input audio signal, a processing unit for audio signal processing of the input audio signal to obtain an output audio signal, a neural network, which, when executed by the processing unit, performs a processing step of the audio signal processing, and an audio output unit for outputting the output signal. Respective input audio signals are obtained using the audio input units of the hearing devices. The input audio signals are processed to obtain respective output audio signals using the processing units of the hearing devices. The processing unit of at least one of the hearing devices executes the respective neural network to perform a processing step of the audio signal processing. Neural network data of the executed neural network is transmitted to the respective other hearing device. The transmitted neural network data is used in audio signal processing by the processing unit of the respective other hearing device. The obtained output audio signals are outputted by the respective audio output units of the hearing devices. The advantages of the method correspond to those of the hearing device arrangement described above. The method may comprise one or more of the optional features described above with respect to the hearing device arrangement.

According to a preferred aspect of the method, the neural networks of different of the hearing devices are configured to perform different processing steps of the audio signal processing. Based on the instantaneous requirements, the suitable neural network may be chosen. It is also possible that both neural networks are executed in parallel. Both neural networks may advantageously contribute to the audio signal processing. Preferably, the respective neural network outputs are transmitted to the other hearing device. The further audio signal processing may then profit from neural network processing of the respective processing steps.

According to a preferred aspect of the method, the transmitted neural network data, in particular the transmitted neural network output, is used as a neural network input for the neural network of the respective other hearing device. This allows to include information obtained by neural network processing on one hearing device in the neural network processing on the respective other hearing device. This is particularly advantageous for binaural processing. In particular, neural networks on the respective hearing devices may be arranged sequentially. For example, a larger neural network may be distributed on one or more devices, in particular the two hearing devices. Complex neural networks can be executed on the hearing devices, in particular on hearing aids, despite limited computational resources and/or battery capacity.

According to a preferred aspect of the method, a work cycle is assigned to each of the neural networks of the hearing devices and the neural networks are executed by the respective processing units in accordance with the respective work cycle. The determined work cycles allow to execute the neural networks based on the respective requirements, in particular to execute the neural networks based on the concrete hearing situation, one or more users of the hearing device arrangement are in. The work cycles may allow for time multiplexing and/or sensor data multiplexing of the neural network processing.

According to a preferred aspect of the method, the work cycles of different neural networks differ, in particular alternate. Differing, in particular alternating, work cycles allow for a particular efficient execution of the neural networks. Battery consumption and computational load are reduced.

According to a preferred aspect of the method, the work cycles are determined based on internal states and/or external states of the hearing device arrangement. This allows to steer the execution of the neural networks based on the respective requirements. For example, the method allows to react to different battery levels of the hearing device. Alternatively or additionally, the execution of the neural networks may be steered based on one or more external states, for example signal quality, latency and/or spatial information.

According to a preferred aspect of the method, features obtained, in particular extracted, from the input audio signal and/or sensor data of at least one of the hearing devices is provided in the respective other hearing device and used as part of a neural network input for the neural network of the respective other hearing device. This particularly improves spatial binaural processing, in particular binaural cues preservation, in hearing device systems. Execution of the neural networks with different, in particular alternating work cycles, particularly profits from an exchange of features of the hearing devices. This increases consistency of the processing upon switching of neural networks based on multiplexing.

As described above, neural network data of the neural network of at least one of the hearing devices is transmitted to the other hearing device. This allows for a particularly advantageous distribution of neural network processing on the hearing devices on a hearing device arrangement, in particular of a hearing device system. The present inventive technology also comprises the general idea of distributing neural network processing on one or more devices of a hearing device system. For example, neural network processing may be distributed on one or more hearing devices and/or a peripheral device and/or a remote device. Distribution of the neural network processing may preferably be based on computational costs for processing the neural network. For example, complex neural networks may be executed on a remote device and/or a peripheral device which is less limited on computational capacity and/or battery capacity. For example, a general classifier may be executed on a peripheral device for audio scene classification. A remote device may be used for particularly complex calculations, in particular for executing complex neural networks, which have a high computational demand. A remote device may preferably used to train neural networks which may later on be implemented on other devices of the hearing device arrangement. Smaller and/or more specialized neural networks may be comprised by an executed on the hearing devices. For example, at least one hearing device may comprise a neural network for local feature extraction, OV detection and/or key word recognition. At least one hearing device may additionally or alternatively comprise a neural network for calculating a filter mask.

In particular, the present inventive technology also comprises distributing neural network processing based on latency requirements. For example, processing steps which allow for a larger latency, e.g. audio scene classification, may be executed on a peripheral device. Processing steps profiting particularly from low latency may preferably be executed on at least one hearing device. For example, filter mask calculation may be performed on at least one hearing device.

The general idea of distributing neural network processing on a hearing device arrangement, in particular based on computational demand and/or latency, is an independent aspect of the present inventive technology, in particular independent of a transmittal of neural network data from one hearing device to the other.

Further details, advantages and features of the inventive technology emerge from the description of illustrative embodiments with reference to the figures.

DETAILED DESCRIPTION

Figure 1:
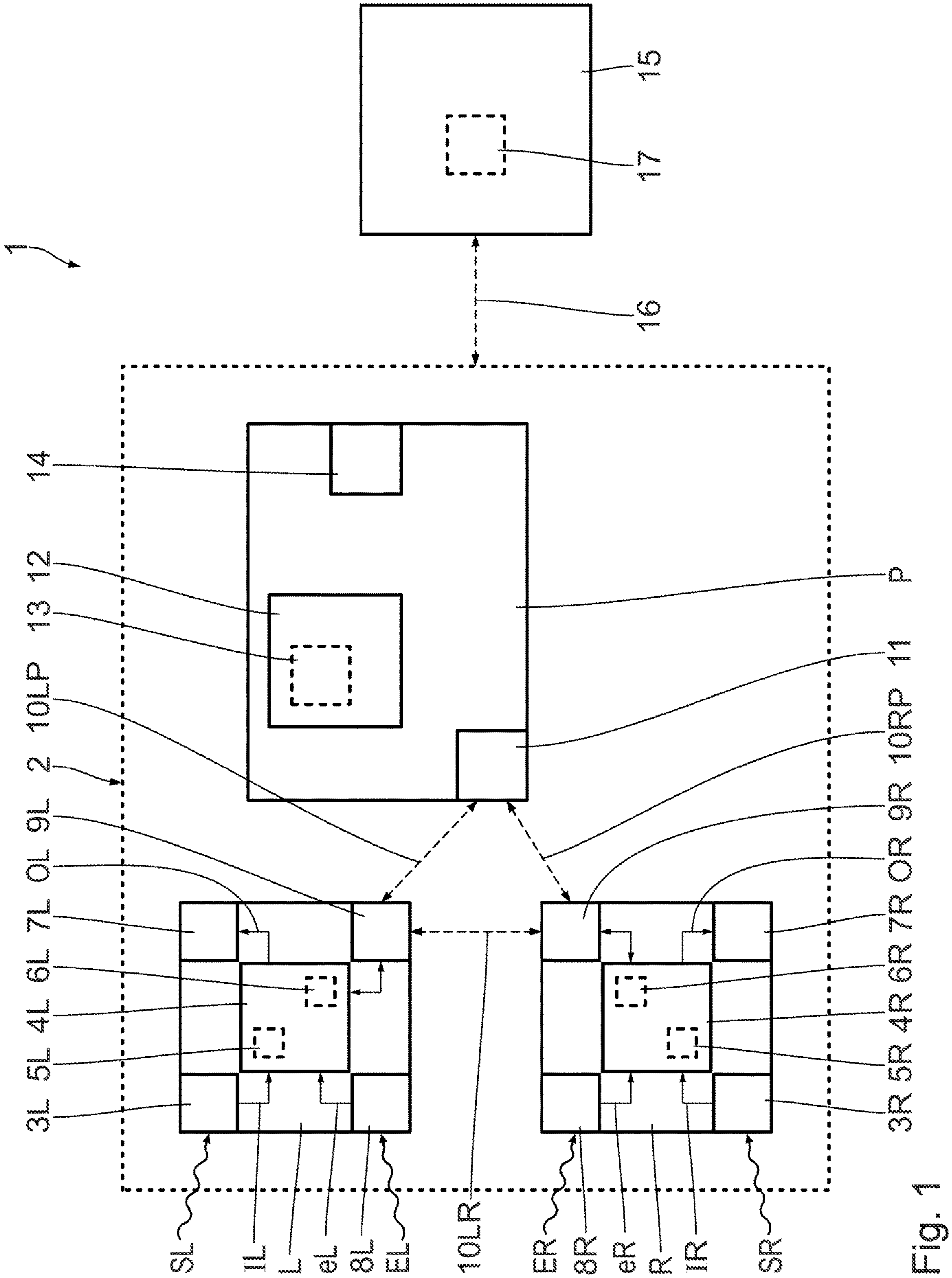
FIG. 1 schematically illustrates an exemplary embodiment of a hearing device arrangement comprising two hearing devices, FIG. 2 schematically depicts an embodiment of audio signal processing on a hearing device arrangement comprising multiplexing of neural network processing on hearing devices of the hearing device arrangement, FIG. 3 schematically illustrates an embodiment of multiplexing neural network processing on several devices of a hearing device arrangement, FIG. 4 schematically illustrates a further embodiment of multiplexing neural network processing on multiple devices of a hearing device arrangement, FIG. 5 schematically illustrates a further embodiment of audio signal processing on a hearing device arrangement comprising multiplexing of neural network processing on hearing devices of the hearing device arrangement, FIG. 6 schematically illustrates a further embodiment of audio signal processing on a hearing device arrangement comprising multiplexing of neural network processing on hearing devices of the hearing device arrangement, FIG. 7 schematically illustrates a further embodiment of audio signal processing on a hearing device arrangement comprising directional classification for steering further processing, FIG. 8 schematically illustrates a further embodiment of audio signal processing on a hearing device arrangement comprising self-monitoring of hearing devices of the hearing device arrangement for steering further processing, FIG. 9 schematically illustrates a further embodiment of audio signal processing on a hearing device arrangement comprising binaural self-monitoring of hearing devices of the hearing device arrangement for steering further processing, FIG. 10 schematically illustrates a further embodiment of audio signal processing on a hearing device arrangement comprising binaural neural network processing distributed among hearing devices of the hearing device arrangement, FIG. 11 schematically illustrates a further embodiment of audio signal processing on a hearing device arrangement comprising distribution of neural network processing among hearing devices of the hearing device arrangement, FIG. 12 schematically illustrates a further embodiment of audio signal processing on a hearing device arrangement comprising distribution of neural network processing on different devices of the hearing device arrangement, FIG. 13 schematically illustrates a further embodiment of audio signal processing on a hearing device arrangement comprising distribution of neural network processing on different devices of the hearing device arrangement, FIG. 14 schematically illustrates a further embodiment of audio signal processing on a hearing device arrangement comprising sequential arrangement of neural networks on different hearing devices, FIG. 15 schematically illustrates a further embodiment of audio signal processing on a hearing device arrangement comprising sequential arrangement of neural networks on different hearing devices, and FIG. 16 schematically illustrates a further embodiment of audio signal processing on a hearing device arrangement comprising distributing neural network processing on different devices of the hearing device arrangement.

FIG. 1 schematically depicts an exemplary hearing device arrangement 1. The hearing device arrangement 1 comprises two hearing devices L, R in form of hearing aids. The hearing devices L, R are part of a hearing device system 2 schematically illustrated by a dashed box surrounding the components of the hearing device system 2. The hearing device system 2 comprises all devices which are associated with a specific user and which contribute to hearing enhancement for that user. The hearing devices L, R are configured to be worn at or implanted in the left and right ear of the hearing device system user, respectively.

The hearing device system 2 optionally comprises a peripheral device P. The peripheral device P is in form of a mobile device, in particular a smartphone. The shown configuration of the hearing device system 2 is purely exemplary. Other hearing device systems may not comprise a peripheral device P or may comprise even two or more peripheral devices. Further, it is possible that the hearing device system only comprises one hearing device, for example a hearing device to be worn in or at one of the ears of the hearing device system user.

In further, not explicitly shown embodiments, the hearing device may belong to different users. In particular, a hearing device arrangement may comprise two or more hearing device systems belonging to different users. Hearing devices of the respective hearing device systems may be connected with each other in data transmitting manner. Hearing devices of different hearing device systems may contribute to audio signal processing by transmitting neural network data from one hearing device to the other. Hearing devices of different hearing device system may be directly connected via wireless data connection or indirectly connected via peripheral devices of the hearing device systems and/or via a remote device, e.g. via the internet. Combining hearing devices of different hearing device systems enhances the flexibility and possibilities of distributed neural network processing.

The hearing devices L, R each comprise an audio input unit 3L, 3R. Here and in the following, the appendix L, R is used to indicate components or signals or other features belonging to or being associated with the respective hearing device L, R. The audio input units 3L, 3R are configured to obtain a respective input audio signal IL, IR. In the shown embodiment, the audio input units 3L, 3R are configured to receive respective input signals in form of ambient sound SL, SR and to convert the received ambient sound SL, SR to the respective input audio signal IL, IR. For that, the audio input units 3L, 3R each comprise an electroacoustic transducer in the form of e.g. one or more microphones. The received ambient sounds SL, SR may be different for the respective hearing devices L, R due to different positions of the hearing devices L, R, in particular the left and right ear of a hearing device system user, respectively. Differences in the ambient sound SL, SR may in particular result from head shadowing. Correspondingly, the input audio signals IL, IR may differ. In other embodiments, the audio input units may be configured to receive respective input signals in form of audio streams streamed from another device, e.g. from external microphones which receive and convert respective ambient sounds.

The hearing devices L, R comprise a processing unit 4L, 4R for audio signal processing of the respective input audio signals IL, IR to obtain an output audio signals OL, OR. The processing units 4L, 4R are not depicted in detail. The processing units 4L, 4R may each comprise a data storage on which audio signal processing routines are stored. The processing units 4L, 4R may further comprise a computing device for executing the audio signal processing algorithms stored on the data storage. The computing device may comprise a processor, in particular a central processing unit (CPU). The computing device may further comprise a main storage.

The hearing devices L, R comprise a neural network 5L, 5R which, when executed, performs a step of the audio signal processing. The neural network 5L, 5R may be stored on and executed by the processing unit 4L, 4R, respectively. The neural networks 5L, 5R of the hearing devices L, R may be trained for equivalent tasks or for different tasks. Neural network processing by executing the neural networks 5L, 5R may perform any suitable step of audio signal processing on the respective hearing device L, R, in particular noise reduction, noise cancellation, noise suppression, noise attenuation, dereverberation, speaker separation, speaker extraction, feature extraction, classification, in particular audio scene classification, and/or own voice extraction. The neural network processing may result in processed audio signals and/or filter masks and/or gain models which can directly be used in and/or converted into an output audio signal. For example, the output audio signal may correspond to a processed audio signal directly outputted by the neural networks 5L, 5R. It is also possible that an audio signal, in particular the input audio signal IL, IR and/or features obtained therefrom, is filtered using a filter mask outputted by the neural networks 5L, 5R. Additionally or alternatively, the neural network processing may indirectly contribute to the audio signal processing, e.g. by steering the further audio signal processing based on a neural network output produced by the neural networks 5L, 5R. For example, the neural networks 5L, 5R may perform an audio scene classification, directional classification and/or self-monitoring. Based on the corresponding results, the further audio signal processing on the hearing devices L, R may be steered. Additionally or alternatively, the neural network processing may contribute to feature extraction, in particular to local feature extraction from the input audio signals IL, IR, and/or other sensor data.

The hearing device L, R comprise further audio processing routines 6L, 6R. The further audio processing routines 6L, 6R are only exemplarily shown. The further audio processing routines 6L, 6R can in particular comprise further neural networks and/or traditional audio signal processing routines. Further audio signal processing routines 6L, 6R may for example comprise filtering routines which filter audio signals based on a filter mask obtained by a neural network processing of the neural networks 5L, 5R. Further audio signal processing routines 6L, 6R may also comprise conditioning routines for conditioning the input audio signals IL, IR for further processing, in particular for further processing by the neural networks 5L, 5R. For example, audio signal processing routines 6L, 6R may comprise algorithms for feature extraction from an audio signal and/or other sensor data.

The hearing devices L, R comprise audio output units 7L, 7R for outputting the output audio signals OL, OR. The audio output units 7L, 7R each comprise an electroacoustic transducer in the form of e.g. one or more loudspeakers or receivers.

The hearing devices L, R comprise sensors 8L, 8R for sensing environmental data EL, ER and/or self-monitoring. Corresponding sensor data eL, eR can be transmitted to the processing units 4L, 4R, respectively for being considered in the audio signal processing. Sensor data eL, eR may contain information on internal states and/or external states of the hearing devices L, R.

Environmental data EL, ER may for example comprise position and/or movement data. For example, sensors 8L, 8R may comprise accelerometers and/or position sensors. For example, external states such as head movement of the user of the hearing device system 2 may be sensed. Exemplary, internal states may relate to battery level, sensor health and/or processing load.

The hearing devices L, R each comprise a data connection interface 9L, 9R. The data connection interfaces 9L, 9R establish a wireless data connection 10 in between different devices of the hearing device arrangement 1. The hearing devices L, R are connected by a wireless data connection 10LR. The left hearing device L is connected to the peripheral device P by a wireless data connection 10LP. The right hearing device R is connected to the peripheral device P by a wireless data connection 10RP. The peripheral device P comprises a data connection interface 11 for establishing the wireless data connections 10LP, 10RP. Any suitable protocol can be used for establishing the wireless data connection 10. Different wireless data connections may employ different data connection technologies, in particular data connection protocols. For example, the wireless data connection 10LR between the hearing devices L, R may be based on another data technology than the wireless data connection 10LP, 10RP between the hearing devices L, R, respectively, and the peripheral device P.

The hearing device arrangement 1 is configured to distribute neural network processing among the devices of the hearing device arrangement 1, in particular the hearing devices L, R. For this purpose, the hearing device arrangement 1 is configured to exchange neural network data ND via the wireless data connection 10LR between the hearing devices L, R. For example, neural network data ND produced by the neural network 5L on the hearing device L is transmitted to the hearing device R and used in the audio signal processing in the hearing device R. Neural network data ND produced by the neural network 5R of the hearing device R may be transmitted to the hearing device L and used in the audio signal processing on the hearing device L.

The peripheral device P comprises a peripheral processing unit 12. The peripheral processing unit 12 may execute a peripheral neural network 13. The peripheral neural network 13 may contribute to the audio signal processing on the hearing devices L, R. Using the peripheral device P allows to distribute neural network processing on even further devices of the hearing device arrangement 1. Neural network processing on the peripheral device P has the advantage that typical peripheral devices are less restricted with regard to computational power and/or battery capacity. For example, neural network processing on a peripheral device P can be used for complex processing tasks which are not critical with respect to latency, such as general audio scene classification.

The peripheral device P may comprise peripheral sensors 14 for sensing further environmental data.

The hearing device system 2 of the hearing device arrangement 1 is in data connection with a remote device 15 in the form of a remote server via remote data connections 16. Remote data connections 16 may for example be established over the Internet. The remote device 15 may comprise remote processing algorithms 17. The remote processing algorithms 17 may contribute to audio signal processing on the hearing devices L, R. For example, remote processing algorithms 17 may comprise one or more neural networks. It is also possible that remote processing algorithms 17 are configured for training neural networks, for example for training and updating neural networks 5L, 5R and/or peripheral neural network 13. Using the remote device 15, audio signal processing, in particular neural network processing as part of audio signal processing, can be distributed on even further devices. In particular, cloud processing can be used for contributing to the audio signal processing on the hearing devices L, R.

Remote data connections 16 may be established using a peripheral device P, for example by using an internet connection of the peripheral device P. Alternatively or additionally, hearing devices L, R may directly connect to the remote device 15 via a remote data connection 16.

Using the hearing device arrangement 1, a distribution of neural network processing over several devices is possible. In particular, neural network processing can be distributed among the hearing devices L, R. Preferably, but not mandatorily, one or more peripheral devices, such as peripheral device P, and one or more remote devices, such as remote device 15, can contribute to the audio signal processing on the hearing devices L, R, in particular by executing respective neural networks.

In the following, exemplary embodiments of audio signal processing are described. The respective audio signal processing may be performed by the hearing device arrangement as shown in FIG. 1. The following embodiments of audio signal processing are described with respect to devices of the hearing device arrangement 1 in FIG. 1. Of course, it is possible to use other hearing device arrangements for the respective audio signal processing. For example, it may be sufficient that the hearing device arrangement only comprises two hearing devices and not a peripheral device and/or a remote device.

In the following embodiments, audio signal processing is described with respect to functional steps of the audio signal processing. Data transfer between the functional steps is indicated using arrows. Data transfer between different devices is indicated by arrows with dashed lines. Many of the functional steps can be performed by different devices. In case one of the exemplary functional steps is associated with one of the hearing devices, this is indicated by respective appendix (e.g. "L" for the left hearing device) and/or by a dotted box resembling the respective device. It should be borne in mind, that the following embodiments are only exemplary. In case a functional step is shown to be associated with a specific device, the same functional step or an equivalent functional step may be performed by a different device in another embodiment.

Figure 2:
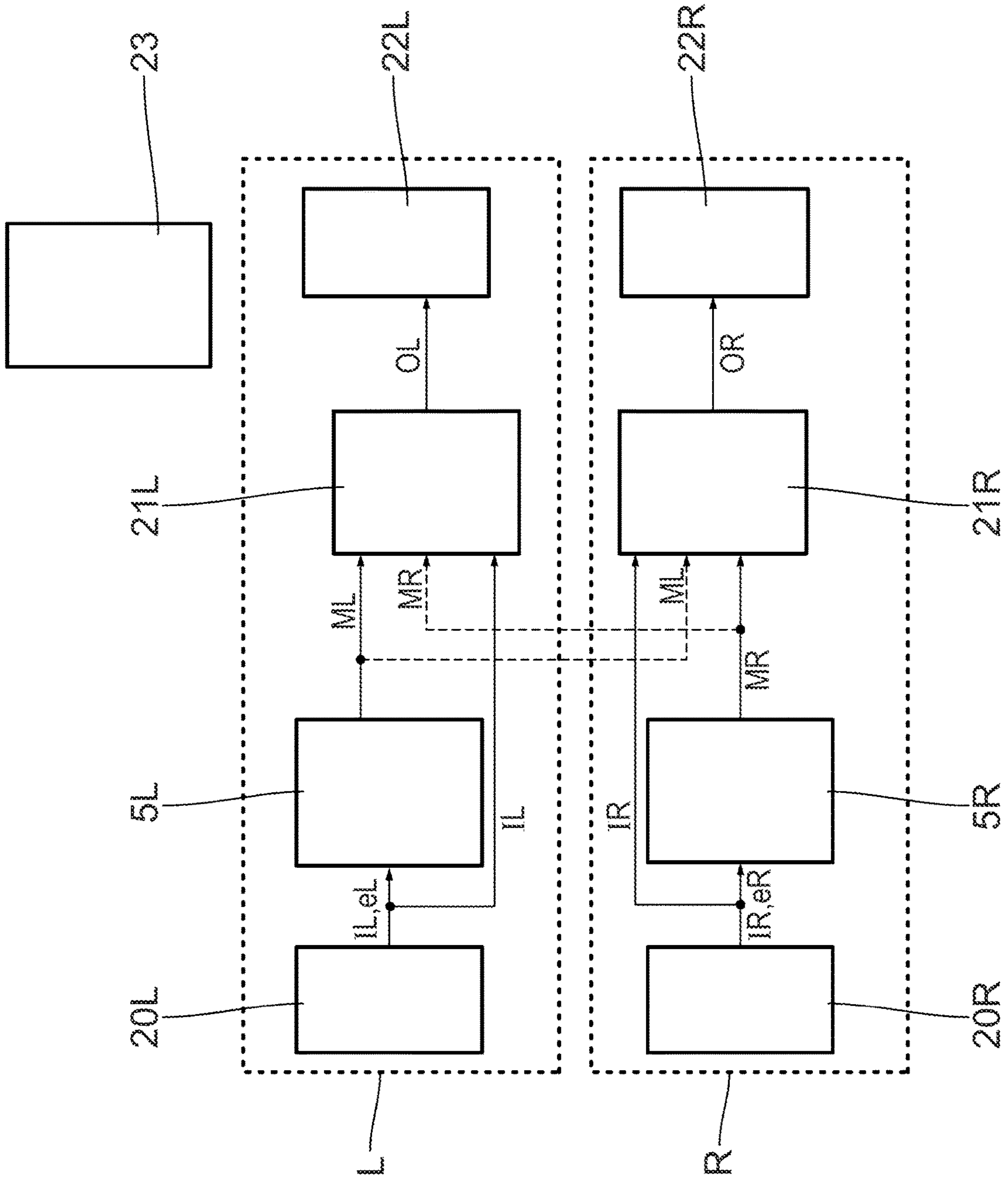

With reference to FIG. 2, an embodiment of audio signal processing on a hearing device arrangement is described. In the embodiment shown in FIG. 2, neural network processing is distributed between the hearing devices L, R.

Input audio signals IL, IR and/or sensor data eL, eR are provided in a respective input step 20L, 20R on the respective hearing devices. The provided data, in particular the input audio signal IL, IR, are inputted to the respective neural network 5L, 5R. The neural networks 5L, 5R are trained for calculating a filter mask ML, MR based on the input audio signal IL, IR and/or sensor data eL, eR, respectively. The filter masks ML, MR are respective neural network outputs of the neural network 5L, 5R. The input audio signals IL, IR are each duplicated and fed into a respective filter module 21L, 21R. Filtering the respective input audio signal IL, IR with the respective filter mask ML, MR, the filter modules 21L, 21R generate the output audio signals OL, OR. The output audio signals OL, OR are outputted to the user in respective audio output steps 22L, 22R. In the audio output step 22L, 22R, the output audio signal OL, OR may be outputted to the user by using a respective audio output unit 7L, 7R.

The neural networks 5L, 5R may be used to calculate any suitable filter mask, e.g. for noise reduction, cancellation and/or suppression. Further suitable filter masks are for dereverberation, speaker separation, speaker extraction and/or own voice extraction. The neural networks 5L, 5R are trained and executed only with input audio signals IL, IR, respectively, from the audio input units 3L, 3R of the respective hearing device L, R.

The signal processing on the respective hearing device L, R may be performed independently. However, it is beneficial to distribute the neural network processing among the hearing devices L, R. In the shown embodiment, the neural networks 5L, 5R are executed in accordance with a multiplexing scheme. The neural networks 5L, 5R are executed with different work cycles. The execution of the neural networks 5L, 5R, in particular their respective work cycles, are determined by a control unit 23 of the hearing device arrangement 1. The control unit 23 is a functional unit. The control unit 23 may be incorporated in any of the devices of the hearing device arrangement 1, in particular in the hearing devices L, R.

In the shown embodiment, multiplexing of the neural network processing leads to an alternating execution of the neural networks 5L, 5R. The neural networks 5L, 5R are executed at different times. In order to provide continuous output audio signals OL, OR, the hearing device arrangement 1 is configured to transmit the outputted filter masks ML, MR to the respective other hearing device. At times where the neural network 5L is executed on the hearing device L, the filter mask ML is used for filtering the input audio signal IL by filter module 2L. Further, the filter mask ML is transmitted to the other hearing device R and used for filtering the input signal IR by filter module 21R. Hence, both filter modules 21L, 21R use the same filter mask ML provided by neural network 5L. At times where the neural network 5R is executed on hearing device R, the filter mask MR is transmitted to hearing device 5L and used in the respective filter modules 21L, 21R for filtering the respective input audio signals IL, IR. This way, it is ensured that a filter mask is provided to the filter module 21L, 21R for filtering the respective input audio signal IL, IR even at times when the respective neural network 5L, 5R is not executed.

Multiplexing the neural network execution has the advantage that the neural networks 5L, 5R do not have to be both executed at the same time. This reduces computational load and battery consumption on the individual hearing devices L, R.

Multiplexing the neural network processing is governed by the control unit 23. Different multiplexing schemes may be employed. For example, the neural network processing may be subjected to time multiplexing. In time multiplexing, the neural network processing alternates based on a given time schedule. For example, the respective work cycles can be equally redistributed leading to 50% work cycles on the respective devices.

Additionally or alternatively, multiplexing may be performed based on sensor data multiplexing. Sensor data multiplexing uses sensor data regarding external and/or internal states of the hearing devices L, R to distribute the work cycles for executing the respective neural networks 5L, 5R. Suitable internal states may be obtained from system monitoring of the hearing devices. Relevant internal states may comprise memory capacity, processor load, working temperature, battery level, sensor health and/or radio strength. For example, the work cycles may be based on the respective battery levels of the hearing devices L, R. The work cycles may be distributed in a way so that an equal amount of battery consumption is achieved. Additionally or alternatively, work cycles may be determined in a way to equalize the state of charge of the respective batteries of the hearing devices L, R.

External states may be obtained from sensing audio, motion, location, temperature, pressure, light and/or health signals. Respective signals may be obtained using the sensors 8L, 8R of the hearing devices and/or a peripheral sensor 14 of a peripheral device P. Based on external states, different selection criteria can be chosen, such as, for example, signal quality, in particular signal-to-noise-ratio, signal strength, signal reliability, in particular dropouts, signal completeness, spectrum, latency, data availability and/or spatial information about the environment, in particular coherence. For example, sensor data multiplexing may be based on signal quality. This way, the hearing device L, R which has the best input audio signals may be chosen for neural network processing.

Figure 3:
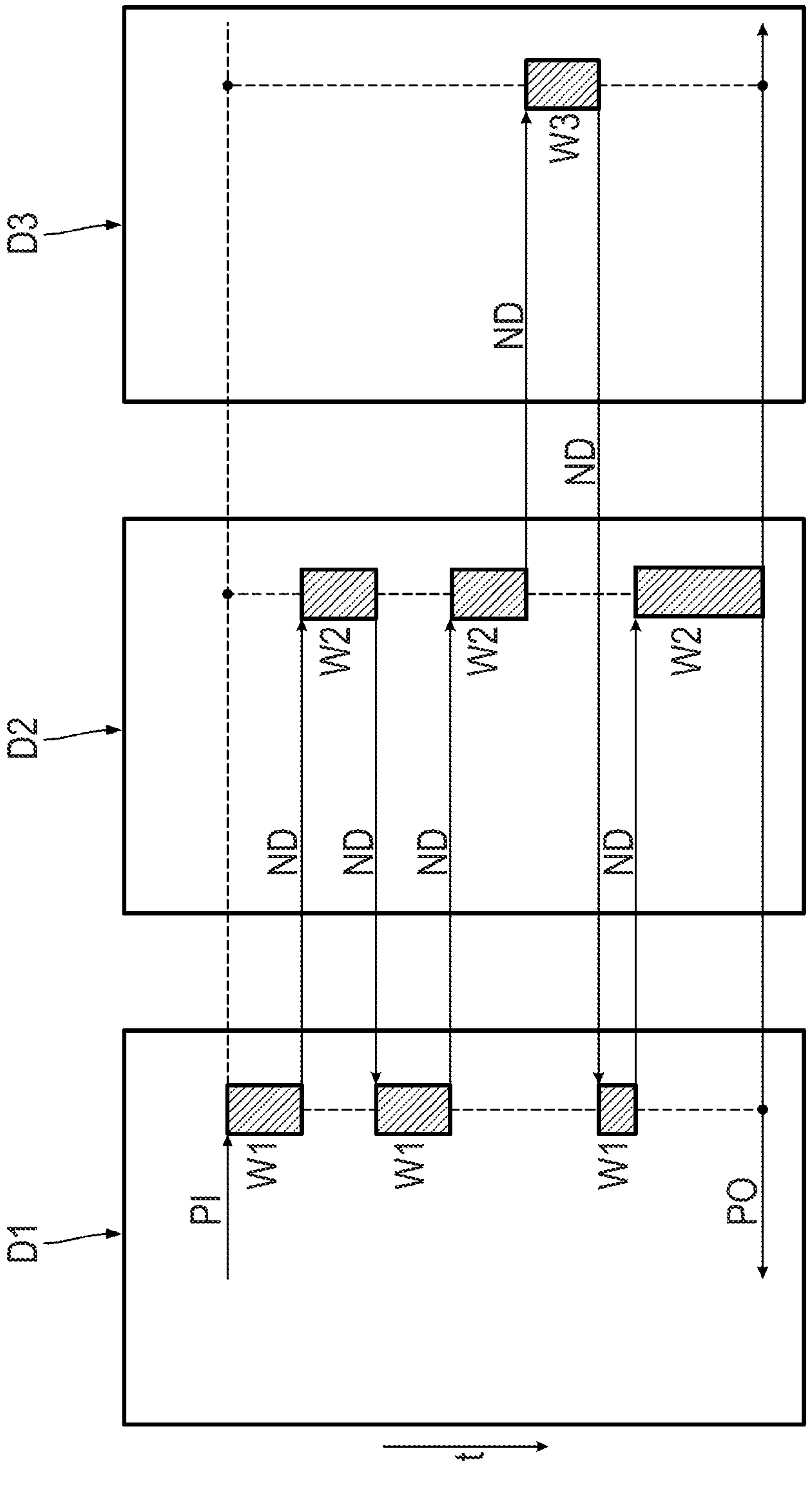

With respect to FIG. 3, an exemplary embodiment of multiplexing neural network processing over several devices of a hearing device arrangement is shown. FIG. 3 generally illustrates multiplexing neural network execution on multiple devices D1, D2, D3. The devices D1, D2, D3 belong to a hearing device arrangement, for example the hearing device arrangement 1 of FIG. 1. For example, D1 may be the left hearing device L and device D2 may be the right hearing device R. Device D3 may be a peripheral device, such as peripheral device P in FIG. 1, and/or a remote server, such as remote server 15 in FIG. 1. It is also possible that device D3 is a further hearing device, in particular a hearing device belonging to another user. The multiplex scheme shown in FIG. 3 allows for a distribution of the neural network processing over several hearing devices, peripheral devices and/or remote devices.

In the embodiment of FIG. 3, a common processing input PI is inputted to the devices D1, D2, D3 and distributed among the devices. The processing input PI is processed using distributed neural network processing in accordance with a multiplexing scheme to obtain a processing output PO.

FIG. 3 illustrates the multiplexing scheme along a time axis t. For each device D1, D2, D3, respective work cycles W1, W2, W3 are shown. Work cycles W1, W2, W3 determine the time slots in which the respective neural networks are active. At the end of a respective work cycles W1, W2, W3, processing is handed over to the device which performs the next work cycle in the sequence of work cycles. Handing over of processing is shown in FIG. 3 by arrows. At the time of neural network switching, also neural network data ND may optionally be transmitted to the next neural network. In particular, internal neural network states, such as features or weights, may be transmitted to the next neural network. This way, processing context can be handed over to the next neural network, improving coherence of the neural network processing in the multiplexing scheme.

The different work cycles W1, W2, W3 are shown not to overlap in FIG. 3 for simplicity. In practice, a small time overlap is beneficial for providing a smooth transition of neural network processing, in particular for fading the processing transition.

In other embodiments, the work cycles may also overlap, leading to a parallel execution of one or more neural networks on one or more devices. In yet further embodiments, neural network processing may be distributed, in particular multiplexed, on only two or more than three devices. The size of the hearing device arrangement may be flexibly scaled based on the respective demands.

Figure 4:
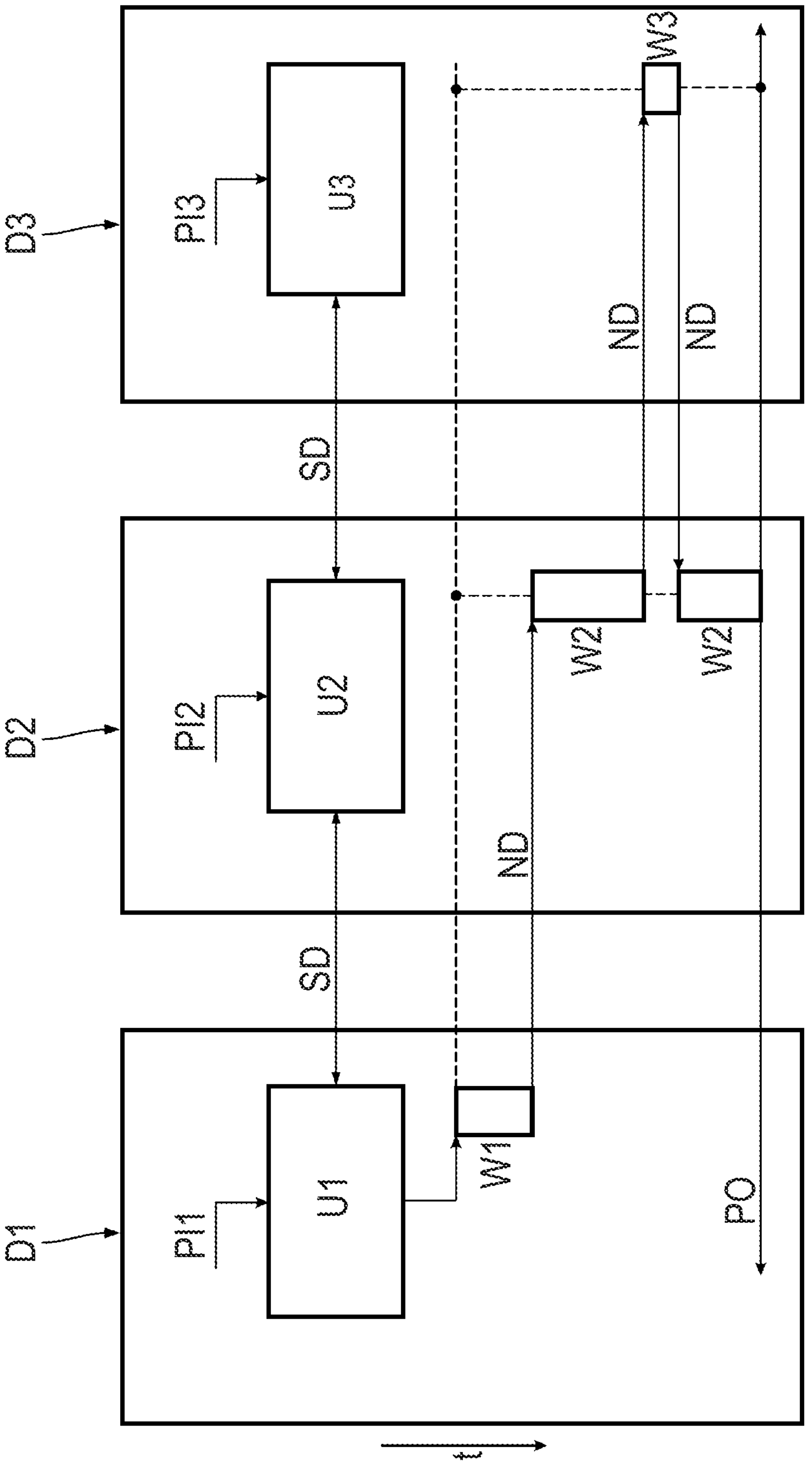

FIG. 4 schematically illustrates a further embodiment for distributing neural network processing over several devices of a hearing device arrangement in accordance with a multiplexing scheme. As shown in FIG. 4, neural network processing is multiplexed on three devices D1, D2, D3 of a hearing device arrangement in accordance with respective work cycles W1, W2, W3.

The embodiment of FIG. 4 differs from the embodiment in FIG. 3 in that each device D1, D2, D3 comprises a respective selection unit U1, U2, U3 for determining the respective work cycles. Each device D1, D2, D3 receives a respective processing input PI1, PI2, PI3, which is inputted into the respective selection unit U1, U2, U3. The selection units U1, U2, U3 exchange selection data SD based on the respective processing input PI1, PI2, PI3. For example, the selection data SD may comprise characteristics and/or features extracted from the respective processing inputs PI1, PI2, PI3. Based on a selection data SD, the selection units U1, U2, U3 determine the work cycles W1, W2, W3 and exchange processing data, in particular neural network data ND, as needed. Upon significant change in the processing input PI1, PI2, PI3, in particular the respective characteristics and/or features, switching of neural network processing among the device D1, D2, D3 is triggered by the selection units U1, U2, U3. The multiplexing scheme shown in FIG. 4 is particularly suitable for sensor data multiplexing, in particular based on the respective signal quality of the processing inputs PI1, PI2, PI3, in particular respective input audio signal obtained by the respective devices D1, D2, D3.

Figure 5:
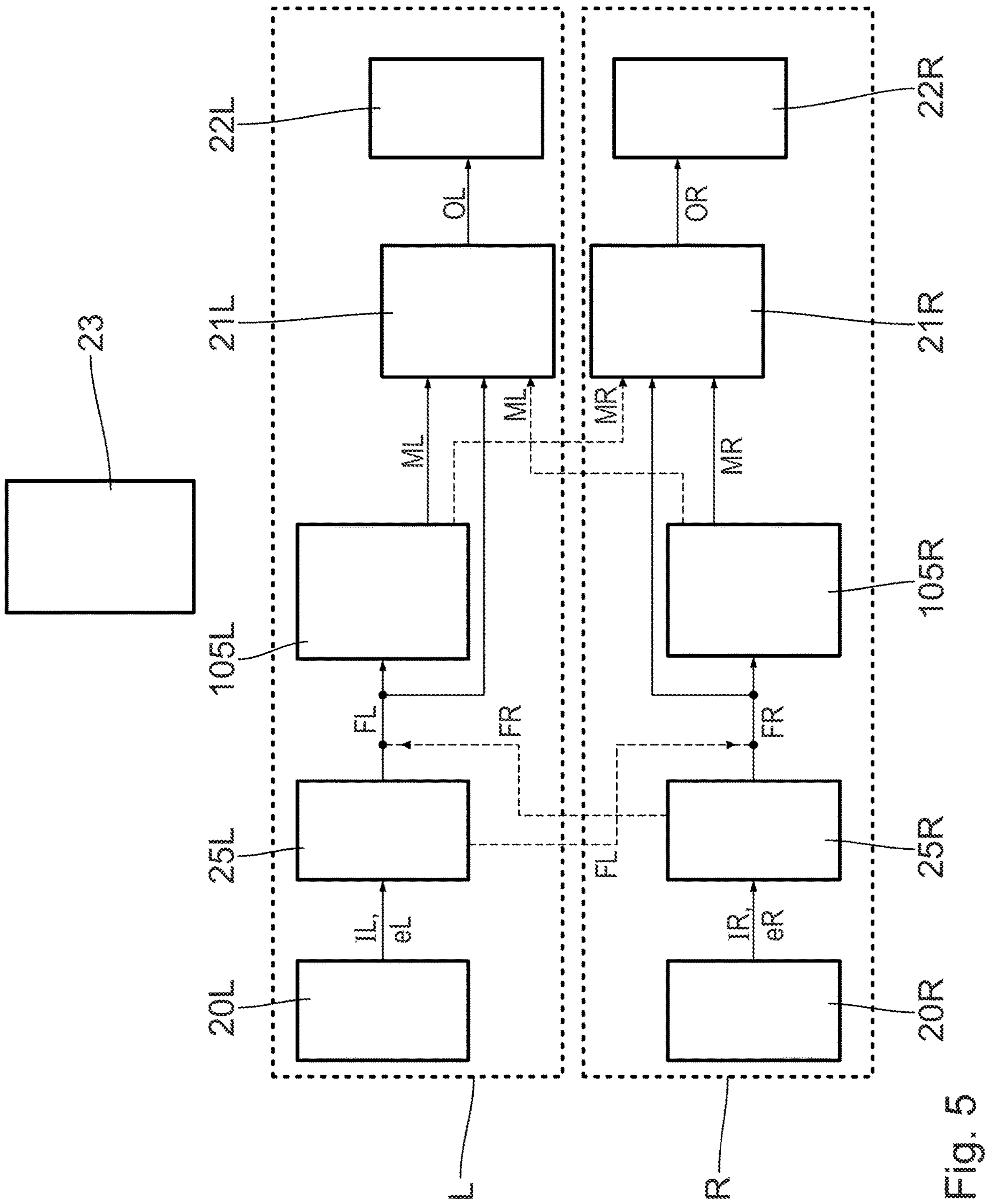

With reference to FIG. 5, a further embodiment of audio signal processing on a hearing device arrangement is described. Components, processing steps, signals and other features corresponding to those, which have already been described with reference to the embodiments in FIGS. 1 to 4, carry the same reference numbers and are not described again in detail.

The audio signal processing shown in FIG. 5 uses multiplexing of neural networks 105L, 105R. Multiplexing of the neural networks 105L, 105R is controlled by the control unit 23. In the embodiment of FIG. 5, the neural networks 105L, 105R are trained with data obtained by audio input units 3L, 3R and/or sensors 8L, 8R of both hearing devices L, R. Training may preferably use a loss function minimizing binaural cue distortion.

Loss functions minimizing binaural cue distortion may in particular regularize one or more of the following properties: interaural intensity difference (IID, also referred to as interchannel intensity difference), interaural phase difference (IPD, also referred to as interchannel phase difference), interaural coherence (IC, also referred to as interchannel coherence), and overall phase difference (OPD). Particularly suitable loss functions and training methods are described in B. Tolooshams and K. Koishida: "A Training Framework for Stereo-Aware Speech Enhancement using Deep Neural Networks", arXiv:2112.04939v2, 31.01.2022.

In inference mode, the neural networks 105L, 105R receive inputs based on the respective input audio signals IL, IR and/or the respective sensor data eL, eR of the both hearing devices L, R for binaural processing. A respective feature extraction step 25L, 25R is performed for extracting features FL, FR from the input audio signals IL, IR and/or the sensor data eL, eR, which have been obtained in an input step 20L, 20R on the respective hearing device L, R. The extracted features FL, FR are transmitted to the respective other hearing device L, R and combined with the features FR, FL extracted thereon. Thus, the input to the neural networks 105L, 105R contains features FL, FR from both hearing devices L, R. Transmitting extracted features FL, FR has the advantage that the corresponding data volume is significantly less than the data volume of corresponding unprocessed input audio signals IL, IR and/or sensor data eL, eR. Transmission of extracted features FL, FR may be multiplexed in accordance with the multiplexing of the neural networks 105L, 105R. For example, when neural network 105L is active, only features FR obtained in feature extraction step 25R are transmitted from the right hearing device to the left hearing device L. This way, transmitted data volume can be further reduced.

In other embodiments, uncompressed or raw input audio signals IL, IR and/or sensor data eL, eR may be exchanged in between the devices in addition to or alternatively to the extracted features FL, FR.

The neural networks 105L, 105R are each configured to calculate two filter masks ML, MR. The outputted filter mask ML is specifically adapted for filtering input audio signals IL and/or respective features FL on the left hearing device L. The outputted filter mask MR is specifically adapted for filtering input audio signals IR and/or respective features FR on the right hearing device R. The filter mask ML, MR adapted for the respective other hearing device L, R is transmitted to that hearing device and used in the respective filter module 21L, 21R. For example, during the work cycle in which the neural network 105L on the left hearing device L is executed, the neural network 105L calculates the filter masks ML, MR. The filter mask ML is used as an input to the filter module 21L on the hearing device L itself. The filter mask MR is transmitted to the right hearing device R and used as an input to the respective filter module 21R. During work cycles in which the neural network 105R on the right hearing device R is executed, the neural network 105R outputs filter mask ML, MR. Filter mask MR is used as an input to the filter module 21R on the hearing device R. Filter mask ML is transmitted to the left hearing device L and used as an input in the respective filter module 21L.

Multiplexing execution of neural networks 105L, 105R for calculating the filter masks ML, MR is more efficient on battery consumption and computational load than calculating the filter masks ML, MR using dedicated neural networks executed in parallel on both hearing devices L, R. Further, the exchange of features FL, FR allows for binaural processing and at the same time provision of dedicated filter masks ML, MR for both hearing devices L, R.

Figure 6:
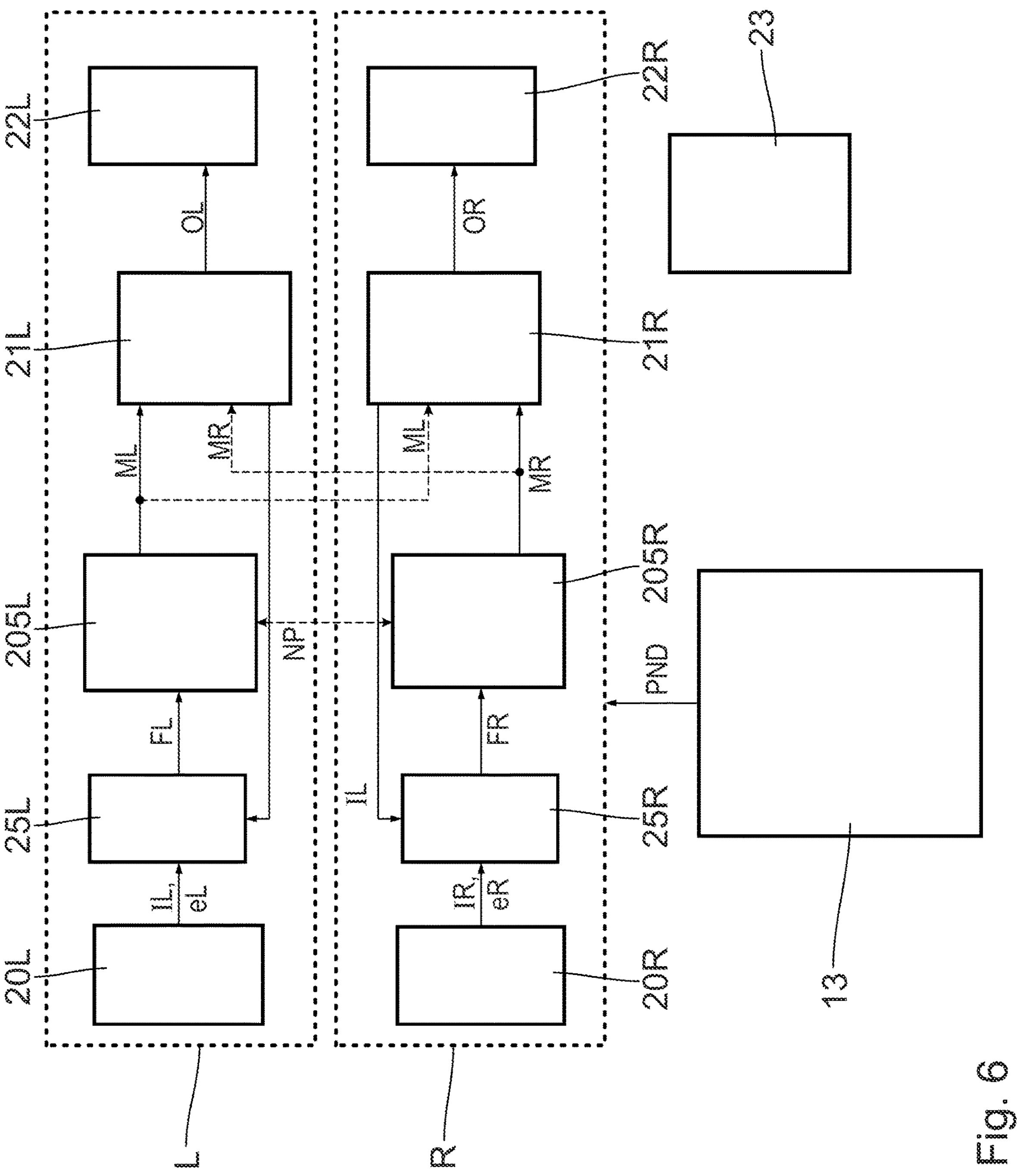

With reference to FIG. 6, a further embodiment of audio signal processing on the hearing device arrangement is described. Components, processing steps, signals and other features corresponding to those, which have already been described with reference to the embodiments in FIGS. 1 to 5, carry the same reference numbers and are not described again in detail.

The audio signal processing in accordance with FIG. 6 uses multiplexing of the neural networks 205L. 205R on the hearing devices L, R. The neural networks 205L, 205R calculate filter masks for filtering the respective input audio signals IL, IR and/or respective features FL, FR in the respective filter modules 21L, 21R. Multiplexing of the neural networks 205L, 205R is controlled by the control unit 23.

In a feature extraction step 25L, 25R, respective features FL, FR are extracted from the input audio signals IL, IR and/or sensor data eL, eR, which have been obtained in respective input steps 20L, 20R. In contrast to the embodiment shown in FIG. 5, the extracted features FL, FR are not exchanged in between the hearing devices L, R. The neural network 205L on the left hearing device L receives features FL as input. The neural network 205R on the right hearing device R receives features FR as input.

The neural networks 205L, 205R are configured to calculate a respective filter mask ML, MR. The neural networks 205L, 205R are executed in accordance with a multiplexing scheme and transmit the calculated filter mask ML, MR to the respective other hearing device L, R. Additionally, the neural networks 205L, 205R are configured to exchange neural network parameters NP. Neural network parameters NP may comprise neural network features and/or neural network states, in particular networks weights. Exchange of neural network parameters NP happens upon the switching from executing one neural network 205L, 205R to the other neural network 205R, 205L in accordance with the multiplexing scheme. Exchanging neural network parameters NP has the advantage that context of the processing can be handed over upon switching neural network processing. This way, coherence in processing is improved. A transition from executing one of the neural networks 205L, 205R to the respective other neural network 205R, 205L is smoothened. Further, the transmission of neural network parameters NP, in particular of neural network features, exchanges binaural information to include such binaural information in the audio signal processing.

In the embodiment of FIG. 6, a peripheral neural network 13 may optionally be executed on a peripheral device. Peripheral neural network 13 may perform additional calculation tasks, in particular calculation tasks which are not critical on latency. For example, peripheral neural network 13 may perform an audio scene classification. Peripheral neural network data PND is provided by the peripheral neural network 13 to the hearing devices L, R. Peripheral neural network data PND may be used for steering audio signal processing on the hearing devices L, R. Particularly preferably, peripheral neural network data may comprise peripheral neural network features and/or peripheral neural network states which may be inputted to the neural networks 205L, 205R for adapting the neural network processing, for example to a respective audio scene determined by the peripheral neural network 13.

Figure 7:
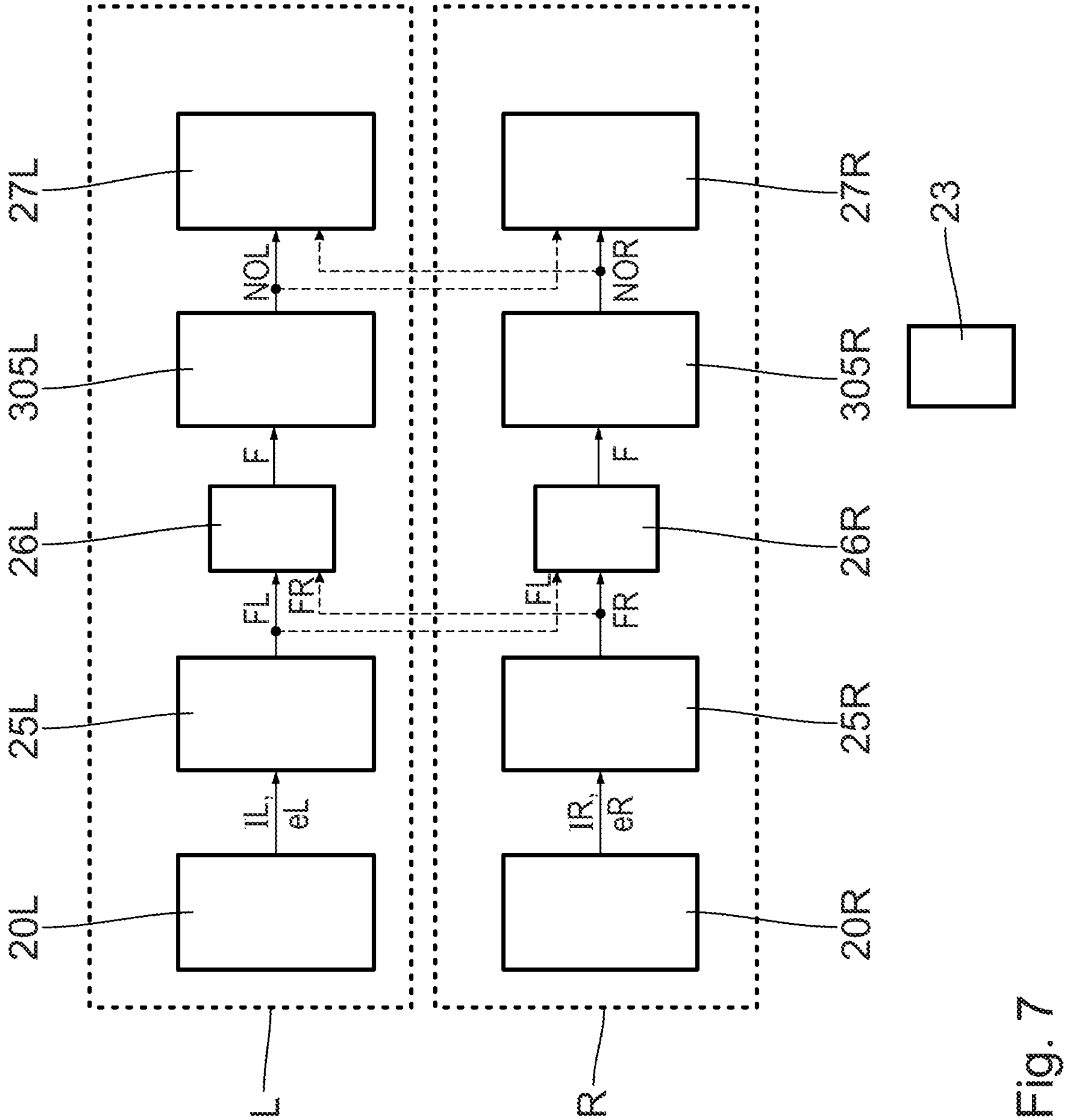

With respect to FIG. 7, a further embodiment of audio signal processing on a hearing device arrangement is described. Components, processing steps, signals and other features corresponding to those, which have already been described with reference to the embodiments in FIGS. 1 to 6, carry the same reference numbers and are not described again in detail.

In the audio signal processing according to FIG. 7, neural networks 305L, 305R are configured for directional classification. That is, the neural networks 305L, 305R determines a direction from which a signal, in particular the sound corresponding to the input audio signals IL, IR, emerges. Features FL, FR are extracted from input audio signals IL, IR and/or sensor data eL, eR in respective feature extraction steps 25L, 25R. The extracted features FL, FR are transmitted to the respective other hearing device L, R. In respective binaural feature combination steps 26L, 26R, the features FL, FR are combined to a common feature vector F. Common feature vector F is inputted to neural networks 305L, 305R. Based on the common feature vector F, the neural networks 305L, 305F perform directional classification, the result of which is outputted as a neural network output NOL, NOR.

Neural networks 305L, 305R are executed in accordance with a multiplexing scheme. Multiplexing of neural network processing is controlled by control unit 23. Neural networks 305L, 305R are alternately executed. The neural network outputs NOR, NOL of the active neural network 305L, 305R is transmitted to the respective other hearing device R, L and used as an input in the steering unit 27R, 27L.

The neural network output NOL, NOR of the active neural network 305L, 305R is fed into respective steering units 27L, 27R of the hearing devices L, R. Steering units 27L, 27R steer the further audio signal processing on the hearing devices L, R based on the directional classification.

The audio signal processing as shown in FIG. 7 uses multiplexing of a neural network processing for directional classification. Hence, the directional classification itself uses multiplexing of neural network processing. The resulting directional classification is used for steering the further audio signal processing on the hearing device. In particular, steering based on directional classification may be used to control multiplexing of further audio signal processing. In an exemplary use case, the directional classification can be used to control further multiplexing of neural network processing on the hearing devices L, R. For example, neural network processing can be activated on that hearing device L, R which is closer to the sound source based on the directional classification. Being closer to the sound source regularly results in a clearer input audio signal IL, IR. Hence, the respective signal quality is expected to be better.

Figure 8:
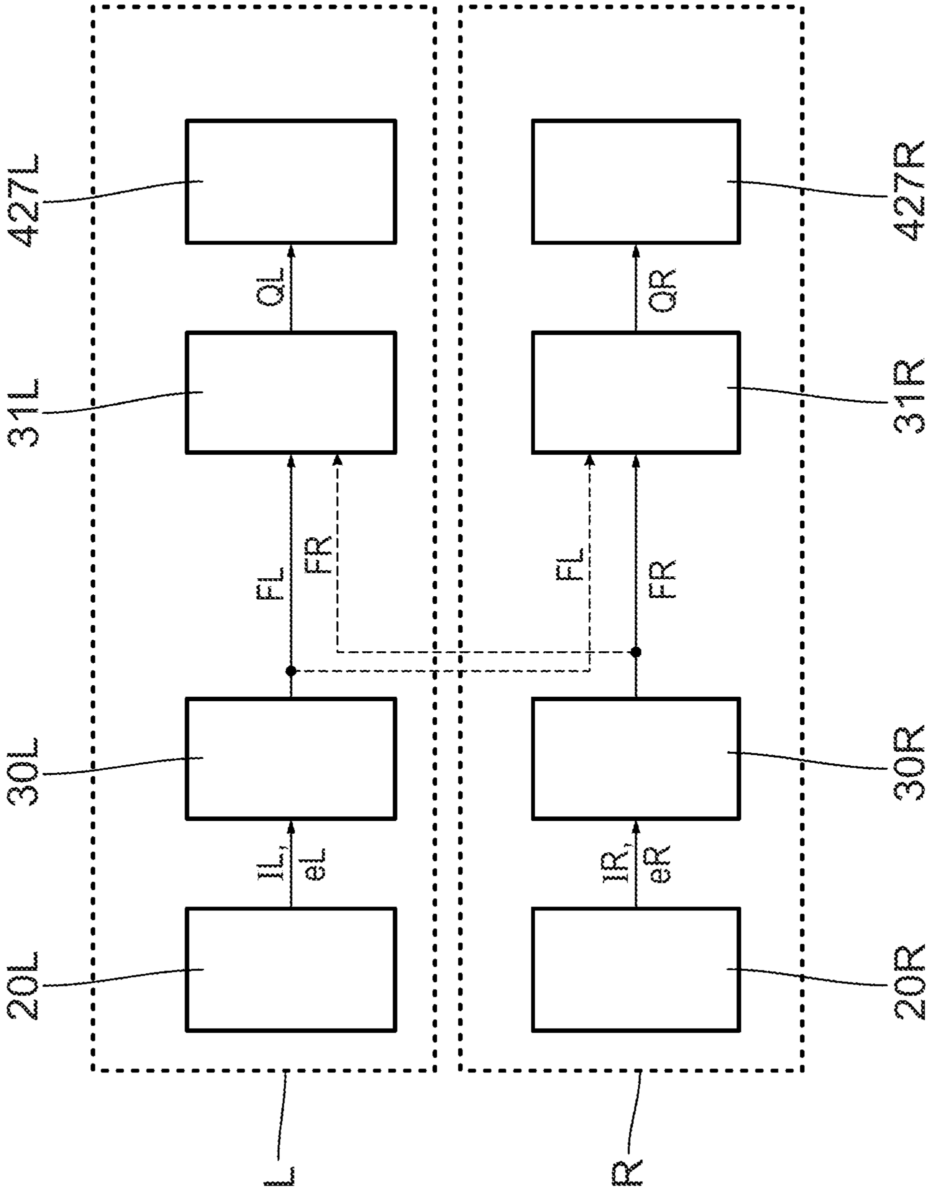

With reference to FIG. 8, a further embodiment of audio signal processing on a hearing device arrangement is described. Components, processing steps, signals and other features corresponding to those, which have already been described with reference to the embodiments in FIGS. 1 to 7, carry the same reference numbers and are not described again in detail.

Audio signal processing according to FIG. 8 comprises self-monitoring of the hearing devices L, R. Both hearing devices L, R obtain respective input audio signals IL, IR and/or sensor data eL, eR in an input step 20L, 20R. Feature extraction units 30L, 30R extract features FL, FR from the obtained input audio signals IL, IR and/or sensor data eL, eR. In particular, features FL, FR may be extracted from sensor data eL, eR which resemble internal states of the respective hearing device L, R. Extracted features FL, FR serve as input to quality checker 31L, 31R. Features extracted on one hearing device L, R are transmitted to a respective other hearing device R, L.

Quality checkers 31L, 31R evaluate the inputted features FL, FR to determine a quality parameter QL, QR. The quality parameter QL, QR resembles the results of the quality checker. For example, quality parameter QL, QR may resemble a signal quality of the input signals IL, IR and/or a fidelity on the respective audio input unit 3L, 3R and/or the respective sensor 8L, 8R. Quality parameters QL, QR are fed into a respective steering unit 427L, 427R. Steering units 427L, 427R steer the further audio signal processing based on the quality parameters QL, QR. For example, multiplexing of neural networks and further audio signal processing may be controlled based on the signal quality of the respective input audio signal IL, IR.

In the embodiment of FIG. 8, feature extraction units 30L, 30R are alternately executed in accordance with a multiplexing scheme. This means that either feature extraction unit 30L or feature extraction unit 30R is active producing features FL and features FR, respectively. The quality checkers 31L, 31R are hence only receiving features FL or features FR at a time. In order to restore binaural information, the quality checkers 31L, 31R may work a time constant which is larger than the alternation period for the feature extraction units 30L, 30R.

Feature extraction units 30L, 30R and/or quality checkers 31L, 31R may comprise neural networks trained for the respective tasks. In case that the extraction units 30L, 30R comprise respective neural networks, multiplexing of the feature extraction units 30L, 30R constitutes multiplexing of neural network processing as a step of the audio signal processing on the hearing devices L, R. The extracted features FL, FR are neural network s transmitted to the respective other hearing device.

Figure 9:
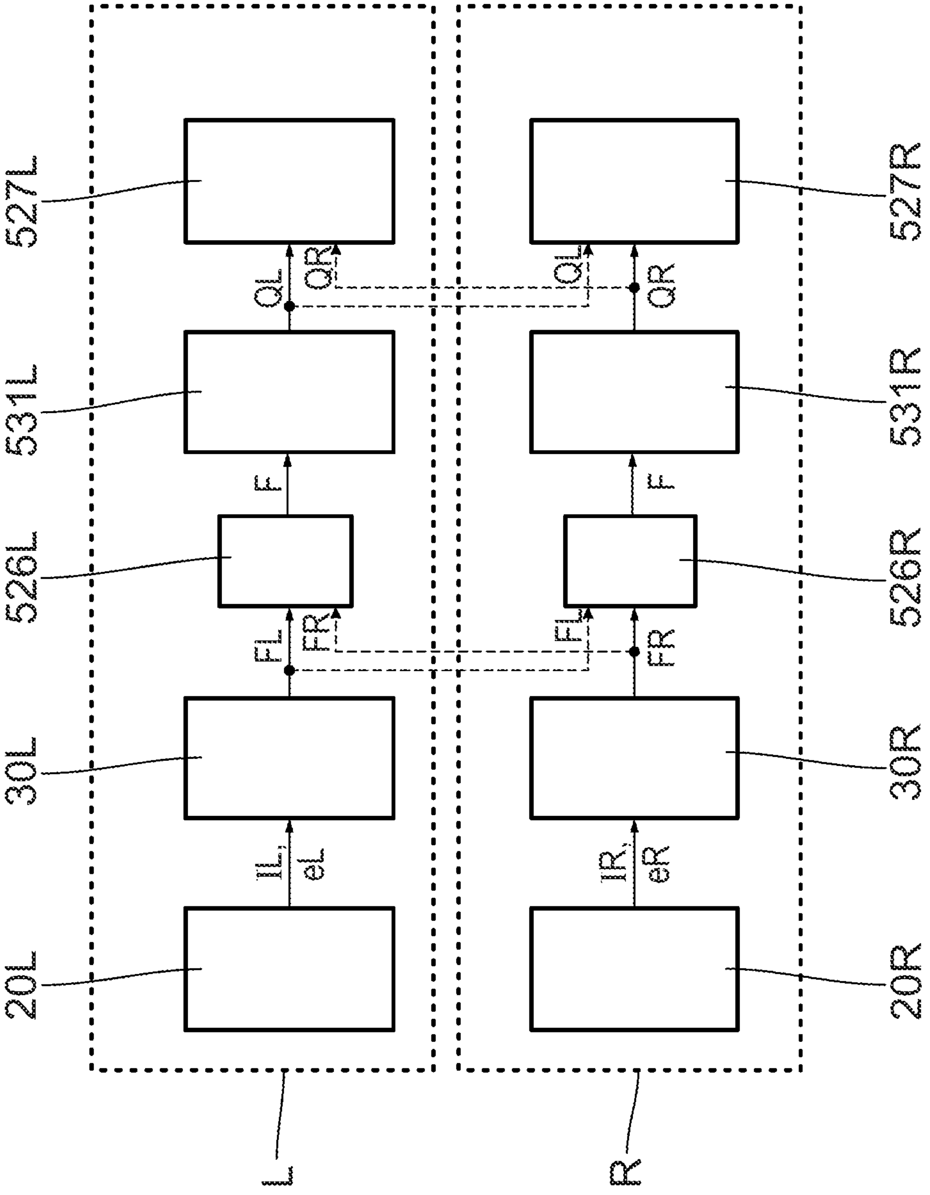

With respect to FIG. 9, a further embodiment of audio signal processing on a hearing device arrangement is described. Audio signal processing in accordance with FIG. 9 comprises self-monitoring Components, processing steps, signals and other features corresponding to those, which have already been described with reference to the embodiments in FIGS. 1 to 8, carry the same reference numbers and are not described again in detail.

In contrast to the embodiment shown in FIG. 8, feature extraction units 30L, 30R are simultaneously executed to produce features FL, FR. The features FL, FR are transmitted to the respective other hearing device R, L. Features FL, FR are combined in binaural feature combination steps 526L, 526R to obtain a common feature vector F. Common feature vector F is inputted in quality checkers 531L, 531R. The quality checker 531L, 531R evaluate the common feature vector F to obtain quality parameters QL, QR. Using binaural feature combination, binaural cues are restored in the self-monitoring without having to execute the quality checkers 531L, 531R with a larger time constant.

In the embodiment of FIG. 9, quality checkers 531L, 531R are alternately executed in accordance with a multiplexing scheme. The quality parameter QL, QR outputted by the active quality checker 531L, 531R is transmitted to the respective other hearing device R, L. Feature transmission and/or binaural feature combination steps 526L, 526R may be alternately executed in accordance with the multiplexing of the quality checker 531L, 531R.

Based on the multiplexing of quality checker 531L, 531R, either quality parameter QL or quality parameter QR is fed into both of the steering units 527L, 527R. Based on the quality parameters QL, QR, further audio signal processing on the hearing devices L, R is steered by the steering units 527L, 527R. For example, multiplexing of neural network processing on hearing devices may be controlled by the steering units 527L, 527R.

The quality checkers 531L, 531R may comprise respective neural networks. In this case, the alternate execution of quality checkers 531L, 531R comprises multiplexing of neural network processing. The quality parameters QL, QR are neural network outputs which are transmitted from one hearing device L, R to the respective other hearing device R, L.

Figure 10:
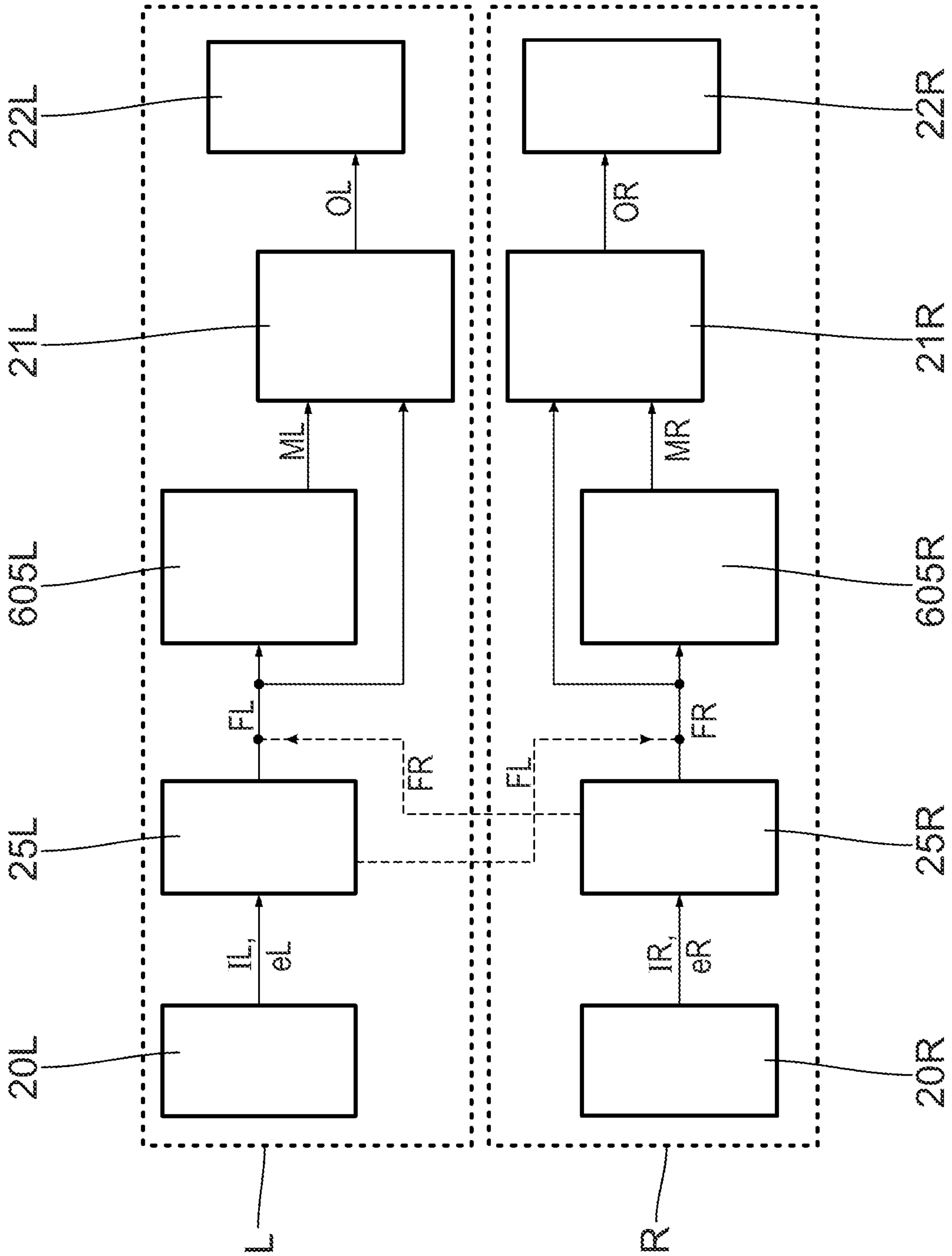

With reference to FIG. 10, a further embodiment of audio signal processing on a hearing device arrangement is described. Components, processing steps, signals and other features corresponding to those, which have already been described with reference to the embodiments in FIGS. 1 to 9, carry the same reference numbers and are not described again in detail.

Input audio signals IL, IR and/or sensor data eL, eR obtained in an input step 20L, 20R are fed into respective feature extraction steps 25L, 25R. In feature extraction steps 25L, 25R, respective features FL, FR are extracted from the input audio signal IL, IR and/or sensor data eL, eR. The obtained features FL, FR are transmitted to the respective other hearing device R, L and combined with features FR, FL extracted thereon. The combination of features FL, FR is fed into respective neural networks 605L, 605R. Neural networks 605L, 605R are configured to calculate respective filter masks ML, MR which are outputted by the neural network 605L, 605R. Outputted filter masks ML, MR are provided to respective filter modules 21L, 21R. Filter modules 21L, 21R filter the respective input audio signals IL, IR and/or features FL, FR to obtain respective output audio signals OL, OR.

The filter masks ML, MR calculated on different hearing devices L, R may coincide or differ. In the latter case, differences in the respective input signals IL, IR and/or sensor data eL, eR may be incorporated in the calculation of the filter masks ML, MR.

Due to exchanging features FL, FR between the hearing devices L, R, neural networks 605L, 605R perform mask calculation based on binaural information. Preferably, the neural networks 605L, 605R may be specifically configured, in particular trained for binaural optimization. The audio signals to be filtered by the filter modules 21L, 21R may also comprise binaural information based on the transmitted features FL, FR.

In FIG. 10, neural networks 605L, 605R are executed simultaneously. Parts of the neural network inputs, namely the features extracted on the respective other hearing device L, R, are exchanged between the hearing devices L, R. Thus, the neural network processing and the further audio signal processing benefits from binaural information exchange.

In a variant of the embodiment shown in FIG. 10, it is possible to directly exchange the input audio signals IL, IR and/or sensor data eL, eR between the hearing devices L, R. Respective input audio signals IL, IR and/or sensor data eL, eR may directly be used as an input to the respective neural networks. It is also possible to combine the input audio signals IL, IR and/or sensor data eL, eR and perform feature extraction on the combined input signals and/or sensor data.

Figure 11:
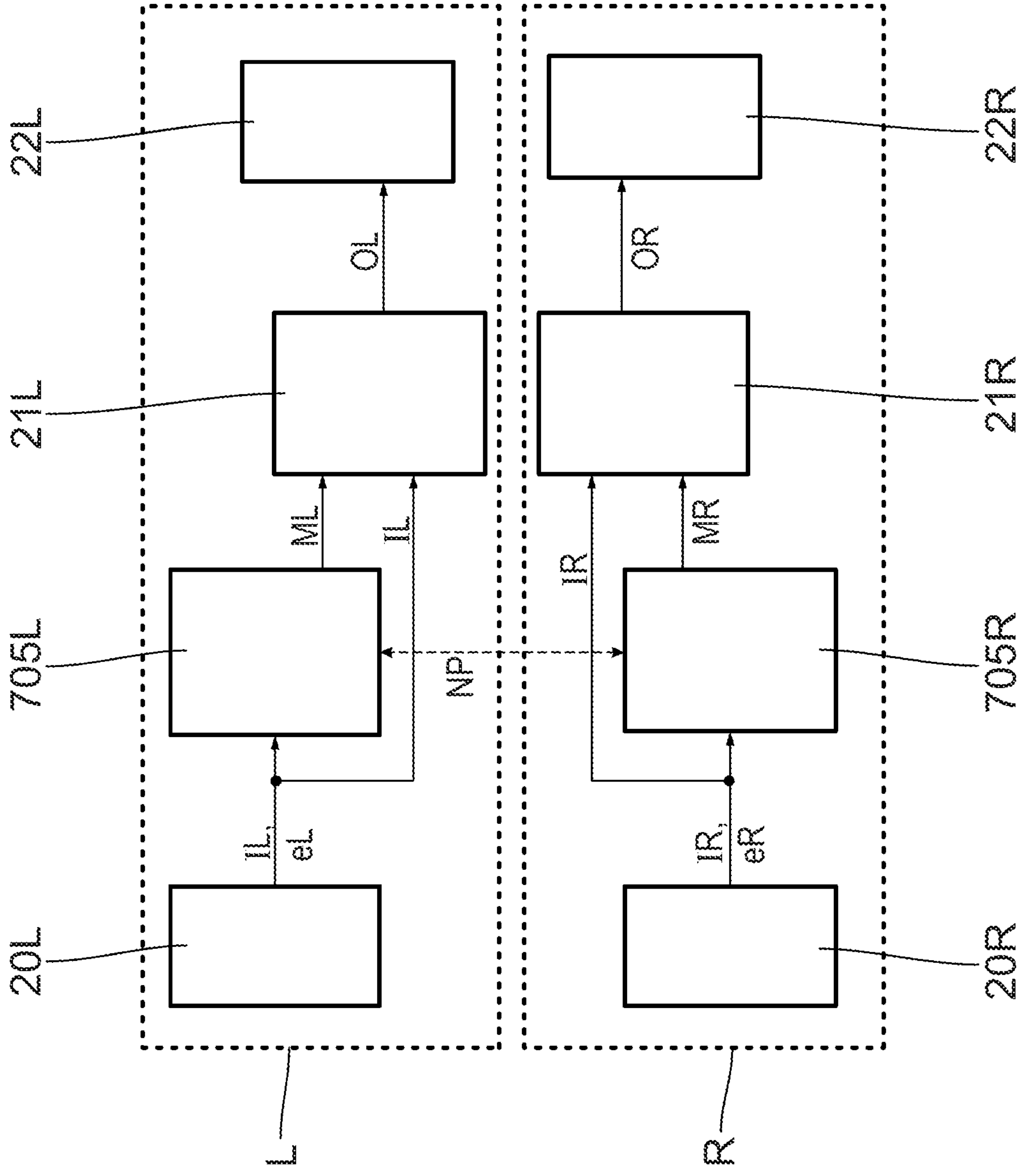

With respect to FIG. 11, a further embodiment of audio signal processing on a hearing device arrangement is described. Components, processing steps, signals and other features corresponding to those, which have already been described with reference to the embodiments in FIGS. 1 to 10, carry the same reference numbers and are not described again in detail.

In the embodiment according to FIG. 11, input signals IL, IR and/or sensor data eL, eR are obtained in respective input steps 20L, 20R. The recived input signals IL, IR and/or sensor data eL, eR are inputted into respective neural networks 705L, 705R. The neural networks 705L, 705R are executed simultaneously. The neural networks 705L, 705R exchange neural network parameters NP. In particular, the neural networks 705L, 705R exchange neural network states and/or neural network features. The exchange of neural network parameters NP leads to a direct binaural coupling of the neural networks 705L, 705R. Binaural information is preserved in the neural network processing.

The neural networks 705L, 705R may be trained with input signals being obtained from the respective input step 20L, 20R on the respective hearing device L, R. Additionally, the neural networks 705L, 705R may be trained with neural network parameters NP provided by the respective other neural network 705R, 705L. A loss function for use in training may be optimized for minimizing binaural cue distortion.

In inference mode, the neural networks 705L, 705R calculate respective filter masks ML, MR based on the respective input signals and the received neural network parameters. The filter masks are provided to filter modules 21L, 21R. Filter modules 21L, 21R filter the respective input audio signals IL, IR using the respective filter mask ML, MR to obtain respective output audio signal OL, OR. The output audio signal OL, OR are outputted in respective audio output steps 22L, 22R.

A particularly advantageous embodiment is achieved by combining the feature exchange as shown in FIG. 10 and the neural network parameters exchanged as shown in FIG. 11. Features FL, FR extracted from respective input audio signals IL, IR and/or sensor data eL, eR as well as neural network parameters NP can be exchanged in between the hearing devices L, R. This way, binaural information exchange is further improved. Binaural distortion is minimized.

Figure 12:
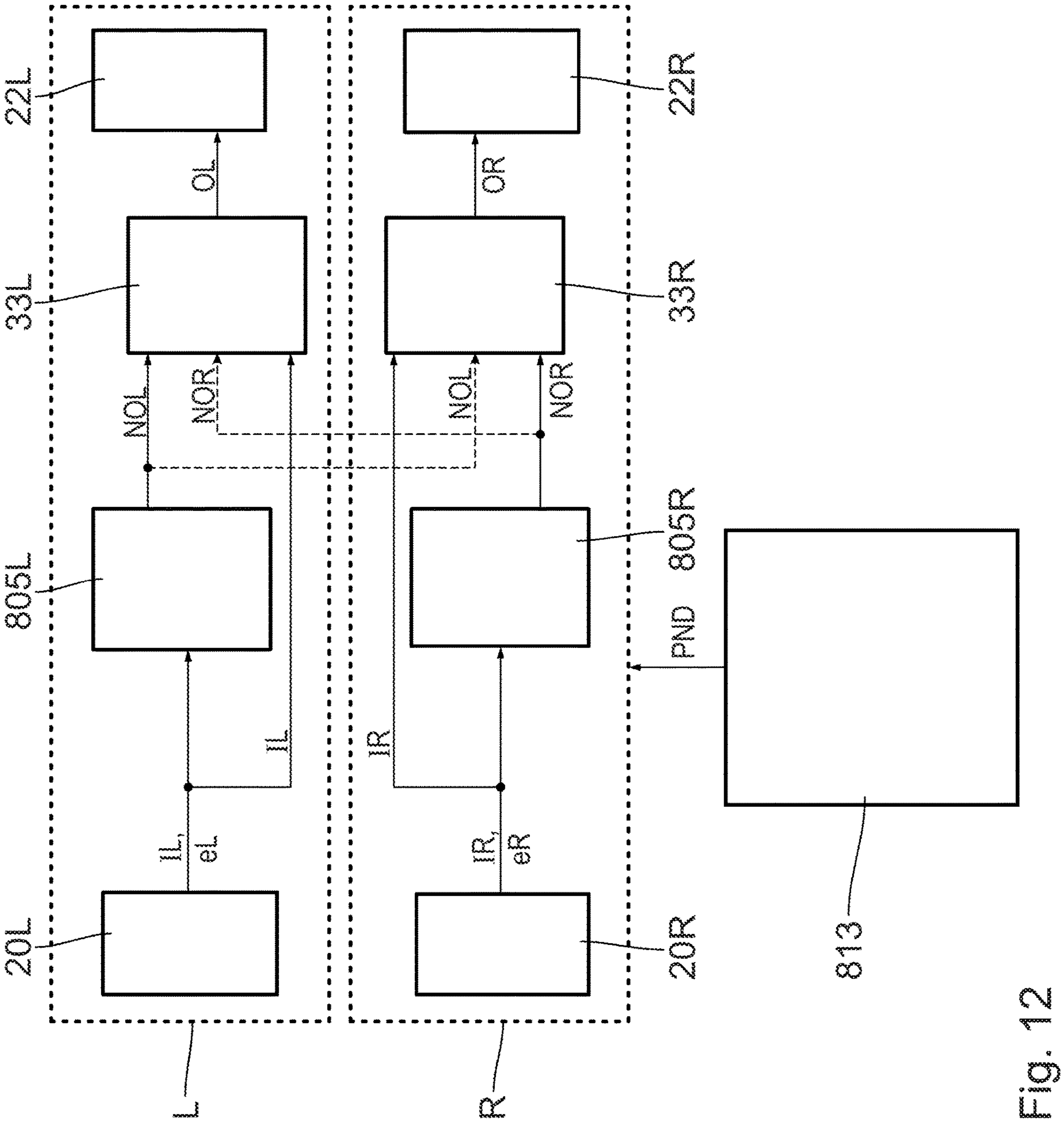

With reference to FIG. 12, a further embodiment of audio signal processing on a hearing device arrangement is described. Components, processing steps, signals and other features corresponding to those, which have already been described with reference to the embodiments in FIGS. 1 to 11, carry the same reference numbers and are not described again in detail.

Input audio signals IL, IR and/or sensor data eL, eR are obtained in a respective input step 20L, 20R on each of the hearing devices L, R. The obtained input audio signals IL, IR and/or sensor data eL, eR are inputted in respective neural networks 805L, 805R. The neural networks 805L, 805R process the respective input audio signal IL, IR and/or sensor data eL, eR for performing respective steps of the audio signal processing.

The neural networks 805L, 805R are executed simultaneously. The neural networks 805L, 805R are configured to perform different steps of the audio signal processing. Neural network 805L on the left hearing device L calculates a neural network output NOL. Neural network 805R on the right hearing device R calculates a neural network output NOR. The neural network output NOL is transmitted from the left hearing device L to the right hearing device R. The neural network output NOR is transmitted from the right hearing device R to the left hearing device L. Thus, both neural network outputs NOL, NOR are available on each hearing device L, R for further processing.

Each hearing device L, R comprises a respective audio processing routine 33L, 33R for audio signal processing of the respective input audio signals IL, IR to obtain respective output audio signals OL, OR. The neural network outputs NOL, NOR are inputted into the audio processing routines 33L, 33R. The neural network outputs NOL, NOR steer the audio signal processing by the audio processing routines 33L, 33R. The output audio signals OL, OR are outputted in an audio output step 22L, 22R.

In the shown embodiment, neural network 805L is trained for own voice recognition and/or keyword recognition. Neural network output NOL contains information on whether the own voice and/or a specific keyword has been recognized in the input audio signal IL. Neural network 805R is trained for audio scene classification. Neural network output NOR contains information on the classified audio scene. Using the neural network outputs NOL, NOR, signal processing by the audio processing routines 33L, 33R can be steered, in particular by choosing adequate processing algorithms and/or filters.

The above-specified network configurations of neural networks 805L, 805R are only exemplary. Of course, other configurations of one or both neural networks 805L, 805R are possible. It is, for example, also possible that neural networks 805L, 805R may be configured for local feature extraction. For example, neural network 805L may extract local features from the input audio signal IL and/or sensor data eL on the left hearing device L. Neural network 805R may be trained for local feature extraction from the input audio signal IR and/or sensor data eR on the right hearing device R. The extracted features may be provided as part of the neural network outputs NOL, NOR to the audio processing routines 33L, 33R to be considered in the audio signal processing.

The distribution of different tasks to be performed by the neural networks 805L, 805R may be based on computational costs. For example, the neural network processing may be distributed in order to equalize computational load on the hearing devices L, R. Additionally or alternatively, computational tasks may be redistributed to equalize battery consumption and/or battery levels on the hearing devices L, R. For example, if the battery level is low on one of the hearing devices L, R, computational tasks may be redistributed from that hearing device to the other. It is also possible to distribute different computational tasks based on specific hardware one one or both of the hearing devices L, R.

In the embodiment of FIG. 12, a peripheral neural network 813 is executed on a peripheral device. Peripheral neural network 813 provides peripheral neural network data PND to the hearing devices L, R. For example, peripheral neural network data may comprise additional input features inputted to neural network 805L and/or neural network 805R. Such input features may be used to steer the neural network processing on the hearing devices L, R. For example, peripheral neural networks may calculate features for a scene classification. Additionally or alternatively, peripheral neural network 813 may perform classification tasks, in particular general audio scene classification, and provide corresponding information to the hearing devices. Peripheral neural network data PND may additionally or alternatively be used as an input to the audio processing routines 33L, 33R for further steering of the audio signal processing.

Figure 13:
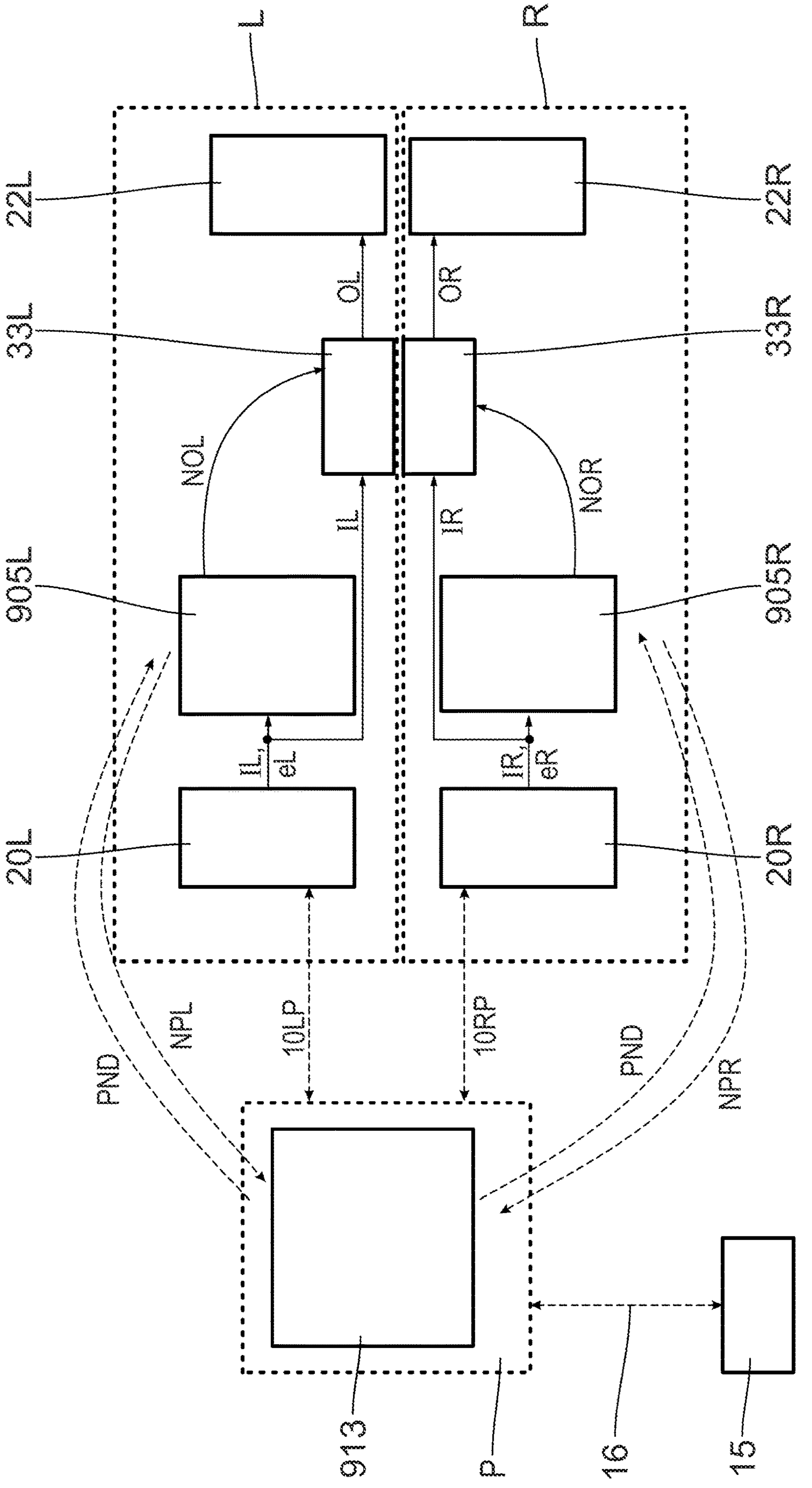

With reference to FIG. 13, a further embodiment of audio signal processing on a hearing device arrangement is described. Components, processing steps, signals and other features corresponding to those, which have already been described with reference to the embodiments in FIGS. 1 to 12, carry the same reference numbers and are not described again in detail.

FIG. 13 schematically depicts a general concept of redistributing neural network processing on hearing devices L, R and a peripheral device P. The hearing devices L, R are in wireless data connection with the peripheral device P. Sensor data obtained by peripheral sensors 14 and/or by input steps 20L, 20R on the respective hearing devices L, R are exchanged via respective wireless data connections 10LP, 10RP. Optionally, the peripheral device P is in data connection with a remote device 15 via a remote data connection 16.

Using additional sensors and/or microphones on the peripheral device P and/or the remote data connection 16, additional information and data can be made available for audio signal processing. Additional information may comprise position data, IoT data, user profile data, user preferences, vital signs, user health data, weather and/or information about other people interacting with the user. Positon data may in particular comprise GPS data, maps and/or meta information about nearby places, for example restaurants and their respective acoustics. Such data may be transmitted from the peripheral device P to the hearing device L, R via the wireless data connections 10LP, 10RP. Such data may be inputted on further processing steps on the peripheral device P, in particular as an input to a peripheral neural network 913.

The peripheral neural network 913 on a peripheral device P may perform a classification of the audio scene and/or user activity and/or user intention.

On the hearing devices L, R, neural networks 905L, 905R can be executed for performing a step of the audio signal processing. Neural networks 905L, 905R may, for example, be configured for a local feature extraction. For example, local features may be calculated by the neural network 905L, 905R based on local input audio signals IL, IR and/or sensor data eL, eR. Suitable local features may, for example, be based on head acoustics, head movements, user activity and/or health sensor information. Local features may in particular comprise correlations, coherence, spectra, focus, i.e. what the user is looking at and/or left-right differences.

Neural network parameters NPL, NPR of neural networks 905L, 905R, respectively, may be provided to the peripheral neural network 913. Such neural network parameter NPL, NPR may be considered by the peripheral neural network 913 in its classification task. For example, neural network parameter NPL, NPR may comprise extracted features and/or pre-classification results obtained by executing neural networks 905L, 905R. Based on the classification preformed by peripheral neural network 913, peripheral neural network data PND may be provided to the neural networks 905L, 905R. Peripheral neural network data PND may comprise a peripheral neural network output, such as the classification result and/or systems steering commands based on the neural network processing of the peripheral neural network 913. Peripheral neural network data PND may influence the neural network execution on the hearing devices L, R.

The neural networks 905L, 905R provide respective neural network outputs NOL, NOR. Neural network outputs NOL, NOR provide steering commands to respective audio processing routines 33L, 33R. Based on the steering by the neural network outputs NOL, NOR, the respective audio processing routines 33L, 33R perform audio signal processing on the respective input audio signals IL, IR. Output audio signals OL, OR obtained from the respective audio processing routines 33L, 33R are outputted in a respective audio output step 22L, 22R.

Figure 14:
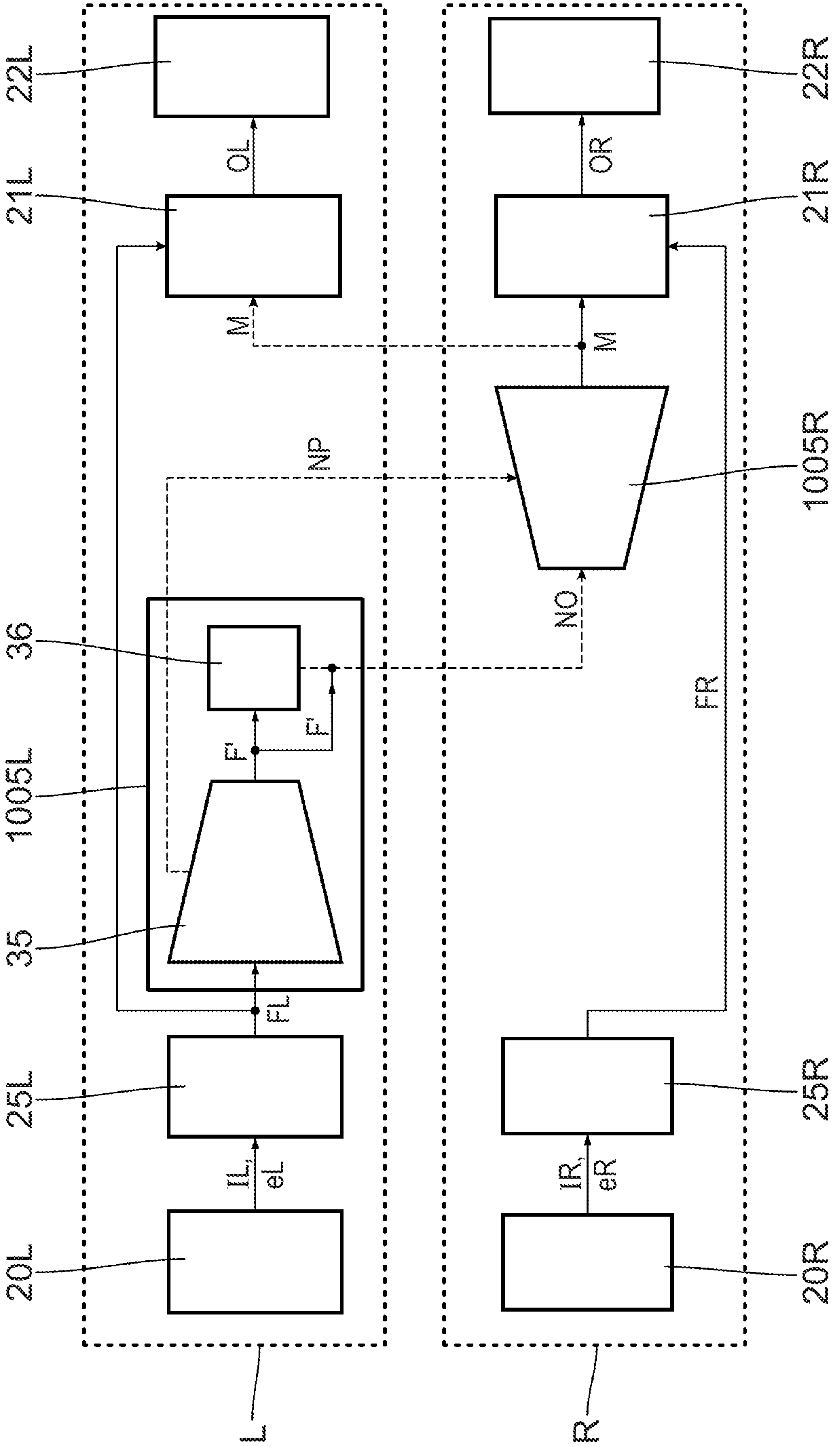

With reference to FIG. 14, a further embodiment of audio signal processing on a hearing device arrangement is described. Components, processing steps, signals and other features corresponding to those, which have already been described with reference to the embodiments in FIGS. 1 to 13, carry the same reference numbers and are not described again in detail.

Input audio signals IL, IR and/or sensor data eL, eR are obtained in a respective input step 20L, 20R on each hearing device L, R. In a respective feature extraction step 25L, 25R, features are extracted from the input audio signal IL, IR and/or the sensor data eL, eR.

The left hearing device L comprises a neural network 1005L. The neural network 1005L receives the features FL extracted in feature extraction step 25L on the left hearing device L. The neural network 1005L comprises an encoder module 35 and a bottleneck module 36. The encoder module 35 encodes the features FL to obtain encoded features F'. Encoded features F' are passed to the bottleneck module 36. A neural network output NO of the neural network 1005L comprises a combination of encoded features F' passing by the encoder module 36 and an output of the bottleneck module 36. The neural network output NO of the neural network 1005L is provided to the right hearing device R.

The right hearing device R comprises a neural network 1005R. The neural network 1005R receives the neural network output transmitted from the left hearing device L as an input. The neural network 1005R realizes a decoder module decoding the neural network output NO to calculate a filter mask M. Neural network parameters NP are transmitted from the encoder module 35 directly to the neural network 1005R. The direct transmission of neural network parameter NP from the decoder module 35 to the neural network 1005R establishes skip connections between the encoder module 35 and the decoder module realized by the neural network 1005R.

Using the neural networks 1005L, 1005R, a complex Unet-shaped model can be implemented on the hearing device L, R by executing different function modules, in this case the encoder module, bottleneck module and decoder module, on different hearing devices L, R.

The mask M which is outputted by the neural network 1005R is transmitted to the left hearing device L. The mask M is used as an input to respective filter modules 21L, 21R on each hearing device L, R. The filter modules 21L, 21R output respective output audio signals OL, OR which are outputted in an audio output step 22L, 22R.

Figure 15:
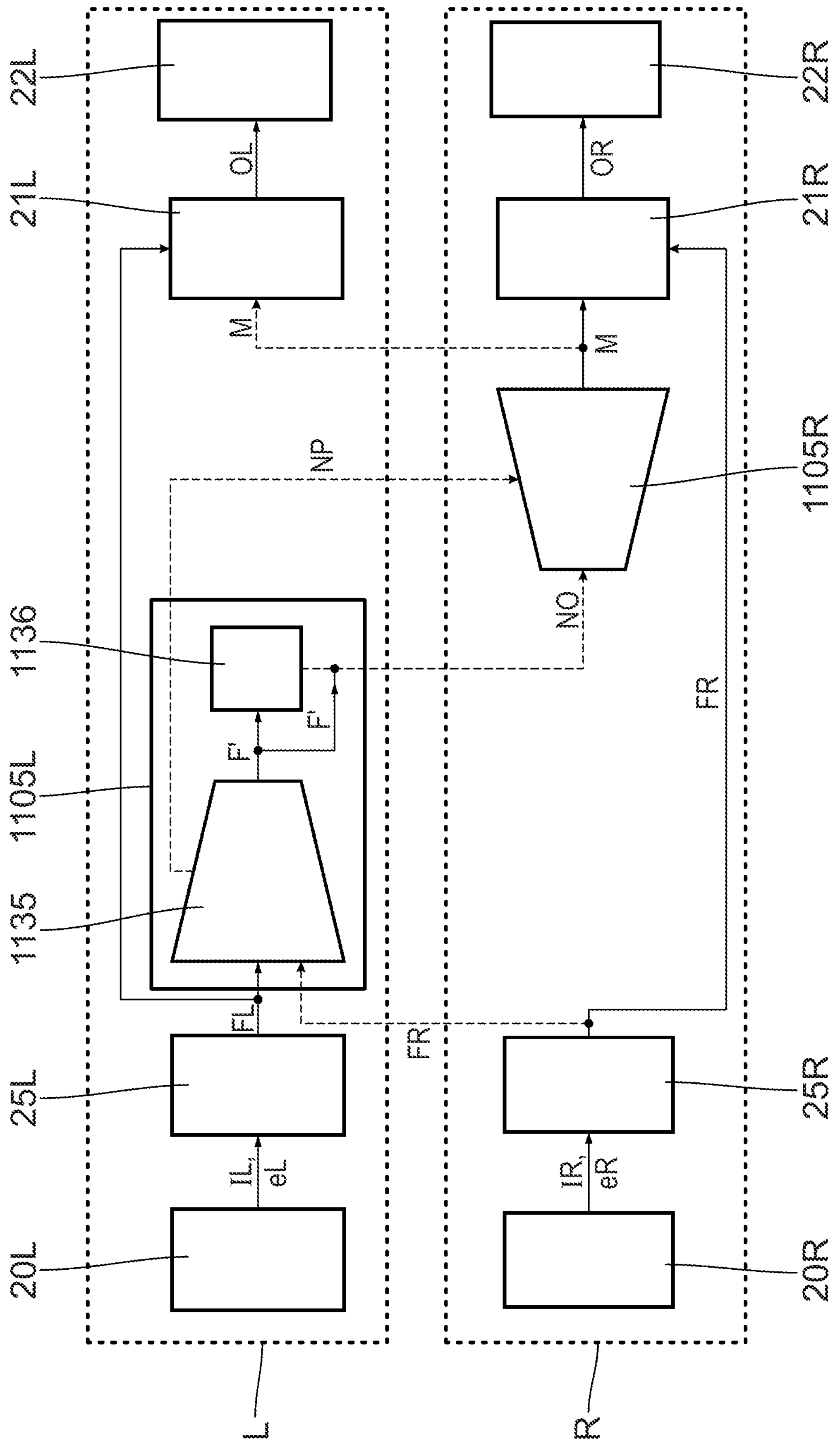

With reference to FIG. 15, a further embodiment of audio signal processing on a hearing device arrangement is described. Components, processing steps, signals and other features corresponding to those, which have already been described with reference to the embodiments in FIGS. 1 to 14, carry the same reference numbers and are not described again in detail.

In addition to FIG. 14, the embodiment shown in FIG. 15 comprises transmitting features FR extracted in a feature extraction step 25R from the right hearing device R to the left hearing device L. The encoder module 1135 of the neural network 1105L on the left hearing device L takes the features FL as well as the transferred features FR as input for calculating encoded features F'. Thus, the variant shown in FIG. 15 includes binaural information in the calculation of the mask M by the consecutively arranged neural networks 1105L, 1105R.

Figure 16:
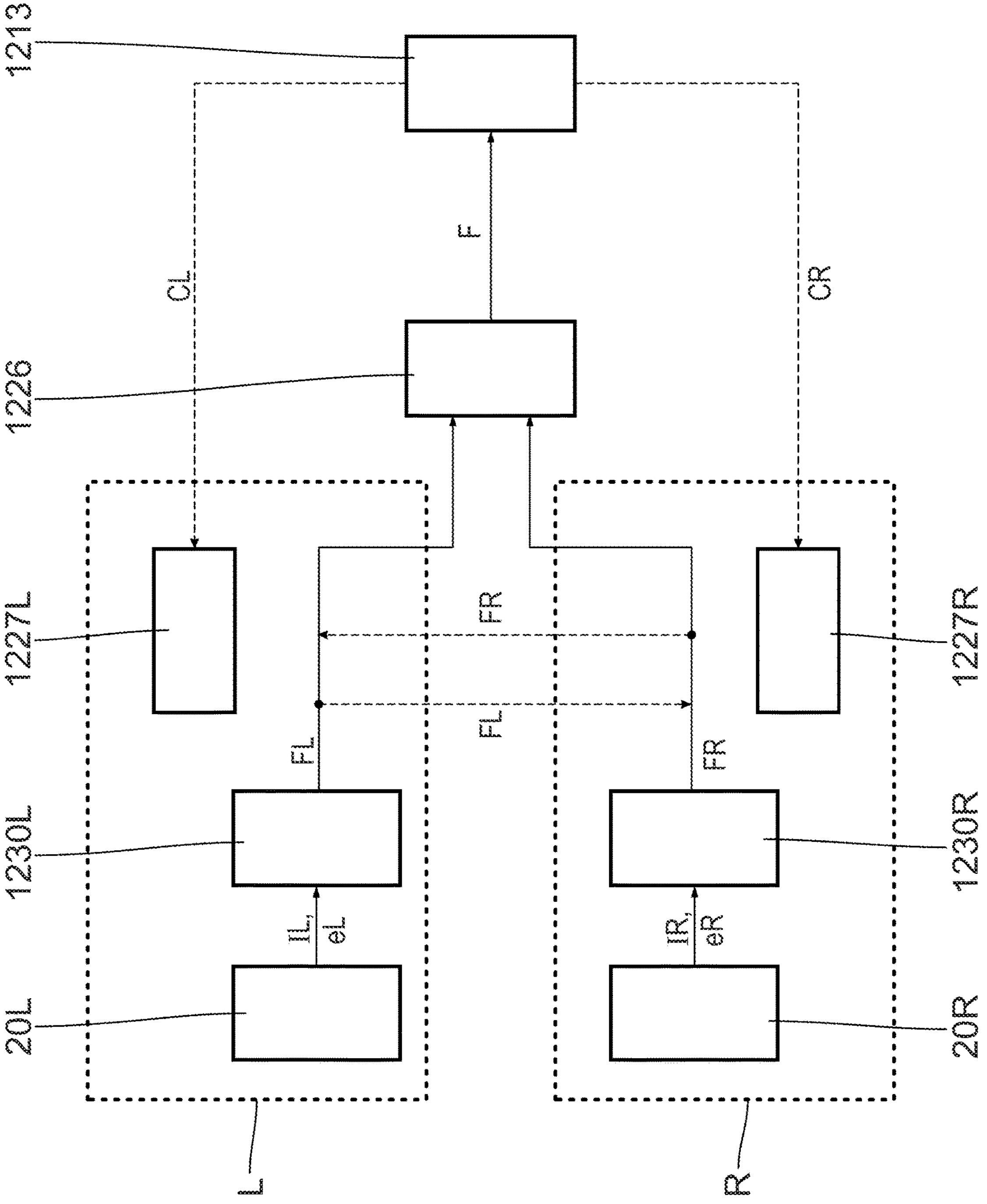

With reference to FIG. 16, a further embodiment of audio signal processing on a hearing device arrangement is described. Components, processing steps, signals and other features corresponding to those, which have already been described with reference to the embodiments in FIGS. 1 to 15, carry the same reference numbers and are not described again in detail.

The hearing devices L, R comprise feature extraction unit 1230L, 1230R which extracts local features from input audio signals IL, IR and/or sensor data eL, eR. Local feature extraction with feature extracting units 1230L, 1230R make use of dedicated hardware. For example, features may be extracted from input audio signals IL, IR on dedicated hardware for Short-Time Fourier Transform (STFT) on a processing unit of the hearing device, in particular on a hearing device processor. Additionally or alternatively, feature extraction units 1230L, 1230R may be realized by dedicated sensor hardware, e.g. by an in-ear microphone or an accelerometer. Extracted features FL, FR may be exchanged between the hearing devices by a wireless link. Feature exchange may be used for multiplexing of the feature extraction by the feature extraction units 1230L, 1230R.

Features FL, FR may optionally be combined in a binaural feature combination step 1226 to obtain a common feature vector F. Binaural feature combination step 1226 may be performed locally on the hearing devices L, R or on a peripheral device P. Common feature vector F may be used as an input in a peripheral neural network 1213. Peripheral neural network 1213 may process feature vector F to calculate steering commands CL, CR for the respective hearing devices L, R. Steering commands CL, CR may be passed to respective steering unit 1227L, 1227R on the respective hearing device L, R. Using steering commands CL, CR, steering units 1227L, 1227R may steer the further audio signal processing on the hearing devices L, R.

The above-discussed embodiments are only exemplary embodiments. Based on the above description, the skilled person will readily realize further embodiments, in particular alterations to the shown embodiments without departing from the inventive technology described herein and covered by the claims. In particular, it is clear to the skilled person that details of the individual embodiments may be combined. For example, some embodiments show the inclusion of processing a peripheral neural network. It is clear that these embodiments may be realized without using network processing on a peripheral device. It is further clear that also other embodiments may profit from processing a peripheral neural network on a peripheral device. Instead of or additionally to executing a peripheral neural network on a peripheral device, a remote neural network executed on a remote device may contribute to audio signal processing.

The invention claimed is:

1. Hearing device arrangement, comprising two hearing devices which are connected to each other in a data transmitting manner, each hearing device comprising:

an audio input unit for obtaining an input audio signal, a processing unit for audio signal processing of the input audio signal to obtain an output audio signal, a neural network which, when executed by the processing unit, performs a processing step of the audio signal processing, and an audio output unit for outputting the output audio signal, wherein the hearing device arrangement is configured to transmit neural network data of the neural network of at least one of the hearing devices to the respective other hearing device to be used in the audio signal processing by the processing unit of the respective other hearing device.

2. Hearing device arrangement according to claim 1, wherein the neural networks of the respective hearing devices are configured to perform different processing steps of the audio signal processing.

3. Hearing device arrangement according to claim 1, wherein the hearing device arrangement is further configured to use the neural network data of the neural network of at least one of the hearing devices as a neural network input for the neural network of the respective other hearing device.

4. Hearing device arrangement according to claim 1, wherein the hearing device arrangement is further configured to use a neural network output (NO) of the neural network data of the neural network of at least one of the hearing devices as a neural network input for the neural network of the respective other hearing device.

5. Hearing device arrangement according to claim 1, wherein the hearing device arrangement is further configured to assign a work cycle to each of the neural networks, wherein the work cycles govern the execution of the neural network by the respective processing units.

6. Hearing device arrangement according to claim 5, wherein the work cycles of neural networks of different of the two hearing devices differ.

7. Hearing device arrangement according to claim 5, wherein the work cycles of neural networks of different of the two hearing devices alternate.

8. Hearing device arrangement according to claim 5, wherein the hearing device arrangement is further configured to determine the work cycles based on internal states and/or external states of the hearing device arrangement.

9. Hearing device arrangement according to claim 1, wherein the hearing device arrangement is further configured to transmit features obtained from the input audio signal and/or sensor data of at least one of the hearing devices to the respective other hearing device and to use the transferred features as part of a neural network input for the neural network of the respective other hearing device.

10. Hearing device arrangement according to claim 1, wherein the hearing devices belong to different users.

11. Hearing device arrangement according to claim 1, wherein the neural network data comprises network weights.

12. Method for audio signal processing, comprising the steps of:

providing two hearing devices which are connected to each other in a data transmitting manner, each hearing device comprising an audio input unit for obtaining an input audio signal, a processing unit for audio signal processing of the input audio signal to obtain an output audio signal, a neural network which, when executed by the processing unit, performs a processing step of the audio signal processing, and an audio output unit for outputting the output audio signal, obtaining respective input audio signals using the audio input units of the hearing devices, processing the input audio signals to obtain respective output audio signals using the processing units of the hearing devices, wherein the processing unit of at least one of the hearing devices executes the respective neural network to perform a processing step of the audio signal processing, neural network data of the executed neural network is transmitted to the respective other hearing device, and the transmitted neural network data is used in the audio signal processing by the processing unit of the respective other hearing device, outputting the output audio signals by the respective audio output units of the hearing devices.

13. Method according to claim 12, wherein the neural networks of different of the hearing devices are configured to perform different processing steps of the audio signal processing.

14. Method according to claim 12, wherein the transmitted neural network data is used as a neural network input for the neural network of the other hearing device.

15. Method according to claim 12, wherein a transmitted neural network output of the transmitted neural network data is used as a neural network input for the neural network of the other hearing device.

16. Method according to claim 12, wherein a work cycle is assigned to each of the neural networks of the hearing devices and the neural networks are executed by the respective processing units in accordance with the respective work cycle.

17. Method according to claim 16, wherein the work cycles of different neural networks of different hearing devices differ.

18. Method according to claim 16, wherein the work cycles of different neural networks of different hearing devices alternate.

19. Method according to claim 16, wherein the work cycles are determined based on internal states and/or external states of the hearing device arrangement.

20. Method according to claim 12, wherein features obtained from the input audio signal and/or sensor data of at least one of the hearing devices is provided to the respective other hearing device and used as part of a neural network input for the neural network of the respective other hearing device.

21. Method according to claim 12, wherein the neural network data comprises network weights.

* * * * *